(12) United States Patent
Pomerleau et al.

(10) Patent No.: US 9,097,085 B2
(45) Date of Patent: Aug. 4, 2015

(54) MULTIPHASE DRILLING SYSTEMS AND METHODS

(75) Inventors: Daniel Guy Pomerleau, Calgary (CA); Keith Kenneth Corb, Calgary (CA); Stuart Dwight Butler, Calgary (CA); Robert T. Staysko, Calgary (CA); Gregg MacKay Jollymore, Cochrane (CA)

(73) Assignee: LUBRIZOL OILFIELD SOLUTIONS, INC., Wickliffe, OH (US)

( * ) Notice: Subject to any disclaimer, the term of this patent is extended or adjusted under 35 U.S.C. 154(b) by 1239 days.

(21) Appl. No.: 12/541,242

(22) Filed: Aug. 14, 2009

(65) Prior Publication Data

US 2010/0147591 A1   Jun. 17, 2010

Related U.S. Application Data

(60) Provisional application No. 61/159,176, filed on Mar. 11, 2009, provisional application No. 61/089,456, filed on Aug. 15, 2008.

(51) Int. Cl.
*E21B 21/14* (2006.01)
*E21B 21/08* (2006.01)

(52) U.S. Cl.
CPC .............. *E21B 21/14* (2013.01); *E21B 21/08* (2013.01)

(58) Field of Classification Search
USPC ............................ 175/69, 65, 38, 25; 166/261
See application file for complete search history.

(56) References Cited

U.S. PATENT DOCUMENTS

| | | | | |
|---|---|---|---|---|
| 3,463,231 | A * | 8/1969 | Hutchison et al. | 166/303 |
| 4,099,583 | A | 7/1978 | Maus | |
| 4,732,580 | A * | 3/1988 | Jain et al. | 62/642 |
| 4,741,401 | A | 5/1988 | Walles et al. | |
| 5,552,377 | A | 9/1996 | Kindred | |
| 5,663,121 | A | 9/1997 | Moody | |
| 5,873,420 | A * | 2/1999 | Gearhart | 175/25 |
| 2003/0079912 | A1* | 5/2003 | Leuchtenberg | 175/38 |
| 2004/0065440 | A1 | 4/2004 | Farabee et al. | |
| 2005/0252286 | A1* | 11/2005 | Ibrahim et al. | 73/152.55 |
| 2006/0283636 | A1* | 12/2006 | Reagan | 175/107 |
| 2007/0129257 | A1* | 6/2007 | Kippie et al. | 507/102 |
| 2007/0256864 | A1 | 11/2007 | Robichaux et al. | |
| 2008/0083564 | A1 | 4/2008 | Collins | |

OTHER PUBLICATIONS

PCT Search Report and Written Opinion dated Sep. 30, 2009.

\* cited by examiner

*Primary Examiner* — David Bagnell
*Assistant Examiner* — Ronald Runyan
(74) *Attorney, Agent, or Firm* — Patterson & Sheridan LLP

(57) ABSTRACT

In one embodiment, a method for drilling a wellbore includes injecting drilling fluid through a drill string disposed in the wellbore and rotating a drill bit disposed on a bottom of the drill string. The drilling fluid includes a liquid and a gas. The drilling fluid is injected at the surface. The drilling fluid exits the drill bit and carries cuttings from the drill bit. The drilling fluid and cuttings (returns) flow to the surface via an annulus formed between the drill string and the wellbore. The liquid is injected at a rate so that a liquid velocity of the returns in the annulus is sufficient to transport the cuttings. The method further includes drilling through at least a portion of a non-productive formation.

4 Claims, 38 Drawing Sheets

| Interval | Meas. Start Depth (m) | Vert. Start Depth (m) | Drilling Method | Hole Size (mm) | Gas Rate (m³/min) | Liquid Rate (m³/min) | LVF (%) | ROP Range (m/hr) | Drill Time (hrs) | ROP Avg (m/hr) | ECD (kg/m³) |
|---|---|---|---|---|---|---|---|---|---|---|---|
| 320 | 55 | 55 | Air | | | | | | | | |
| 330 | 595 | 595 | Embodiment | 311 | 80-100 | 2.4 | 2.3-2.9 | 4-95 | 131 | 10.4 | 600-700 |
| 340 | 1963 | 1963 | Overbalanced | | | | | | | | |
| 350 | 3350 | 3350 | Embodiment | 216 | 80-100 | 1.4-1.6 | 1.4-2.0 | 3-20 | 51.25 | 8.9 | 600-700 |
| 360 | 3805 | 3805 | Overbalanced | | | | | | | | |
| 370 | 4446 | 4301 | Overbalanced | | | | | | | | |
| Total | 6456 | 4540 | | | | | | | | | |

FIG. 3A

| Interval | Meas. Start Depth (m) | Meas. Finish Depth (m) | Drilling Method | Hole Size (mm) | Gas Rate (m³/min) | Liquid Rate (m³/min) | LVF (%) | ROP Range (m/hr) | Drill Time (hrs) | ROP Avg (m/hr) | ECD (kg/m³) |
|---|---|---|---|---|---|---|---|---|---|---|---|
| 380 | 3450 | 4222 | Embodiment | 216 | 60-100 | 1.3-1.6 | 1.3-2.6 | 3-37 | 164 | 4.7 | 600-700 |
| 390 | 3392 | 3898 | Embodiment | 216 | 100-105 | 1.25-1.4 | 1.2-1.4 | 4-43 | 56.25 | 9.0 | 600-700 |

FIG. 3B

| | MOTOR | | | OPTIMUM INJECTION | | |
|---|---|---|---|---|---|---|
| Interval | Make (Name & Size- mm) | Model (lobes & Stages) | Operating Range (m³/min) | Nitrogen (m³/min) | OBM (m³/min) | Volumetric Flow_ELV (m³/min) |
| 330 | National 240 | 6/7 5.0 | 2.27 - 4.54 | 95 | 2.4 | 3.13 |
| 350 | National 171 | 7/8 5.0 | 1.14 - 2.27 | 95 | 1.35 | 2.1 |
| 390 | National 175 | 7/8 5.0 | 1.14 - 2.27 | 100 | 1.38 | 2.1 |

FIG. 3C

| Interval | Meas. Start Depth (m) | Meas. Finish Depth (m) | Drilling Method | Hole Size (mm) | Gas Rate (m³/min) | Liquid Rate (m³/min) | LVF (%) | ROP Range (m/hr) | Drill Time (hrs) | ROP Avg (m/hr) | ECD (kg/m³) |
|---|---|---|---|---|---|---|---|---|---|---|---|
| 330a | 608 | 1488 | Air | 311 | | | | 10-40+ | 57.5 | 15.3 | |
| 330b | 603 | 1240 | Air | 311 | | | | 15-40 | 33 | 19.3 | |

FIG. 3D (PRIOR ART)

| Interval | Meas. Start Depth (m) | Vert. Start Depth (m) | Drilling Method | Hole Size (mm) | Gas Rate (m³/min) | Liquid Rate (m³/min) | LVF (%) | ROP Range (m/hr) | Drill Time (hrs) | ROP Avg (m/hr) | ECD (kg/m³) |
|---|---|---|---|---|---|---|---|---|---|---|---|
| 420 | 55 | 55 | Overbalanced | | | | | | | | |
| 430 | 553 | 553 | Embodiment | 216 | 50-80 | 1.2-1.5 | 1.5-2.9 | 15-290 | 29.25 | 53.5 | 300 |
| 440 | 2118 | 2619 | Underbalanced | | | | | | | | |
| Total | 3826 | | | | | | | | | | |

FIG. 4A

| Formation | Meas. Start Depth (m) | Vert. Start Depth (m) | Pore Pressure (kPa) | EMD (kg/m³) |
|---|---|---|---|---|
| A | 771 | 771 | 2745 | 363 |
| B | 795 | 795 | 7425 | 952 |
| C | 1357 | 1357 | 13,900 | 1044 |
| D | 1487 | 1487 | 11,939 | 819 |
| E | 1643 | 1643 | 14,647 | 909 |
| F | 2027 | 2027 | 21,000 | 1056 |
| G | 2067 | 2067 | 21,500 | 1060 |
| H | 2086 | 2086 | 12,999 | 635 |
| I | 2170 | 2170 | 26,458 | 1214 |
| J | 2456 | 2451 | 26,625 | 1107 |
| K | 2506 | 2494 | 29,558 | 1208 |
| L | 2761 | 2613 | 31,145 | 1214 |

FIG. 4B

| Interval | Meas. Start Depth (m) | Meas. Finish Depth (m) | Drilling Method | Hole Size (mm) | Gas Rate (m³/min) | Liquid Rate (m³/min) | LVF (%) | ROP Range (m/hr) | Drill Time (hrs) | ROP Avg (m/hr) | ECD (kg/m³) |
|---|---|---|---|---|---|---|---|---|---|---|---|
| 450 | 397 | 2740 | Embodiment | 216 | 50-85 | 1.25-1.5 | 1.4-2.9 | 5-135 | 95.75 | 24.5 | 300 |
| 460 | 536 | 2860 | Embodiment | 216 | 30-95 | 1.2-1.45 | 1.2-4.6 | 5-240 | 162.75 | 14.3 | 550 |

FIG. 4C

| | MOTOR | | | OPTIMUM INJECTION | | |
|---|---|---|---|---|---|---|
| Interval | Make (Name & Size- mm) | Model (lobes & Stages) | Operating Range (m³/min) | Nitrogen (m³/min) | OBM (m³/min) | Volumetric Flow_ELV (m³/min) |
| 430 | National 170 | 4/5 7.0 | 1.14 - 2.27 | 70 | 1.34 | 1.7 |
| 460 | National 171 | 7/8 4.8 | 1.14 - 2.27 | 80 | 1.2 | 1.96 |

FIG. 4D

| Interval | Meas. Start Depth (m) | Vert. Start Depth (m) | Drilling Method | Hole Size (mm) | Gas Rate (m³/min) | Liquid Rate (m³/min) | LVF (%) | ROP Range (m/hr) | Drill Time (hrs) | ROP Avg (m/hr) | ECD (kg/m³) |
|---|---|---|---|---|---|---|---|---|---|---|---|
| 520 | 55 | 55 | Air | | | | | | | | |
| 530 | 400 | 400 | Overbalanced | | | | | | | | |
| 540 | 655 | 655 | Embodiment | 311 | 40-95 | 2.24-2.6 | 2.3-6.1 | 5-53 | 26 | 11.3 | 600 |
| 550 | 948 | 948 | Overbalanced | | | | | | | | |
| 560 | 2107 | 2107 | Embodiment | 216 | 80-95 | 1.2-1.3 | 1.2-1.6 | 5-95 | 110 | 9.8 | 600 |
| 570 | 3183 | 3274 | Overbalanced | | | | | | | | |
| 580 | 3437 | 3380 | Overbalanced | | | | | | | | |
| Total | 4463 | | | | | | | | | | |

FIG. 5A

| Formation | Meas. Start Depth (m) | Vert. Start Depth (m) | Pore Pressure (kPa) | EMD (kg/m³) |
|---|---|---|---|---|
| A | 79 | 79 | 95 | 123 |
| B | 517 | 517 | 4900 | 966 |
| C | 589 | 589 | 5500 | 952 |
| D | 640 | 640 | 6200 | 988 |
| E | 723 | 723 | 6850 | 966 |
| F | 787 | 787 | 8180 | 1059 |
| G | 943 | 943 | 9800 | 1059 |
| H | 1667 | 1667 | 18,340 | 1121 |
| I | 1920 | 1920 | 21,400 | 1136 |
| J | 2120 | 2120 | 21,900 | 1053 |
| K | 3227 | 3106 | 33,700 | 1106 |
| L | 3399 | 3247 | 31,488 | 989 |
| M | 3427 | 3267 | 33,795 | 1054 |
| N | 3513 | 3313 | 33,301 | 1025 |

FIG. 5B

| Interval | Meas. Start Depth (m) | Meas. Finish Depth (m) | Drilling Method | Hole Size (mm) | Gas Rate (m³/min) | Liquid Rate (m³/min) | LVF (%) | ROP Range (m/hr) | Drill Time (hrs) | ROP Avg (m/hr) | ECD (kg/m³) |
|---|---|---|---|---|---|---|---|---|---|---|---|
| 590 | 600 | 1003 | Embodiment | 311 | 40-85 | 2.3-2.7 | 2.6-6.3 | 4-57 | 39 | 10.3 | 600 |

FIG. 5C

| | MOTOR | | | OPTIMUM INJECTION | | |
|---|---|---|---|---|---|---|
| Interval | Make (Name & Size- mm) | Model (lobes & Stages) | Operating Range (m³/min) | Nitrogen (m³/min) | OBM (m³/min) | Volumetric Flow_ELV (m³/min) |
| 540 | National 236 | 6/7 5.0 | 2.27 - 4.54 | 88 | 2.4 | 3 |
| 560 | National 171 | 7/8 5.0 | 1.14 - 2.27 | 95 | 1.3 | 1.19 |
| 590 | National 236 | 6/7 5.0 | 2.27 - 4.54 | 86 | 2.4 | 3.89 |

FIG. 5D

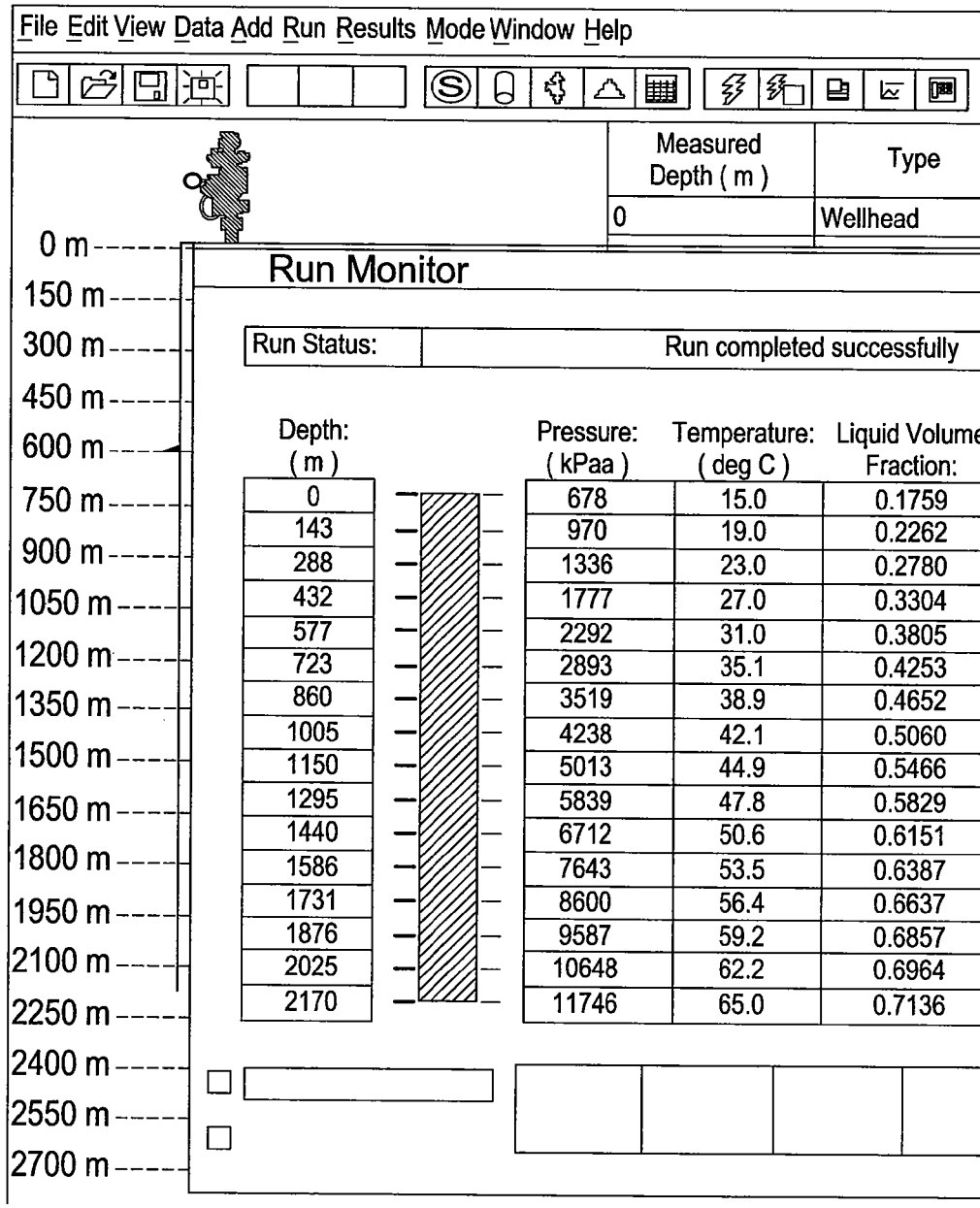
FIG. 6A-A

| Label | |
|---|---|
| Wellhead | N/A |

| Actual Gas Velocity (m/min) | Actual Liq.Velocity (m/min) | Flow Pattern: |
|---|---|---|
| 272.670 | 182.515 | Slug |
| 204.187 | 141.994 | Slug |
| 161.680 | 115.644 | Slug |
| 132.785 | 97.387 | Slug |
| 112.669 | 84.666 | Slug |
| 100.529 | 78.246 | Slug |
| 89.859 | 71.632 | Slug |
| 81.577 | 65.927 | Bubble Flow |
| 75.827 | 61.084 | Bubble Flow |
| 71.437 | 57.330 | Bubble Flow |
| 68.033 | 54.386 | Bubble Flow |
| 76.975 | 62.758 | Bubble Flow |
| 74.336 | 60.464 | Bubble Flow |
| 72.194 | 58.597 | Bubble Flow |
| 103.115 | 87.392 | Bubble Flow |
| 100.817 | 85.403 | Bubble Flow |

Basic | View | Plots | Exit

FIG. 6A-B

Information

Well Head Return Rates ( @ Insitu PT )

| Gas Rate: | HC Liq Rate: | Water Rate: | Pressure: |
|---|---|---|---|
| 100.00sm3/min | 0.0 l/min | 2099.6 l/min | 677.7 kPaa |

Pressure Drop

| Friction: | HydroSt. Head: | Kinetic: | Total: |
|---|---|---|---|
| 406.3 kPa | 10661.8 kPa | 0.0 kPa | 11068.1 kPa |

| Gas Transit: | Liq Transit: | Liquid Holdup: | Motor ELV: |
|---|---|---|---|
| 23.1 min | 29.2 min | 61832.2 liters | 2726.3 i/min |

| No Horiz Liquid in System. | ECD: |
|---|---|
| V Min Liq: 53.981 m/min at 1462 m. (EL=0.6199) | 551.95 kg/m3 |

Additional Inflow ( @ STP )

| Gas Rate: | HC Liq Rate: | Water Rate: | Pressure: |
|---|---|---|---|
| 0.00 sm3/min | 0.0i/min | 0.0 l/min | 0 kPaa |

Bottom Hole Injection Rates ( @ STP )

| Gas Rate: | HC Liq Rate: | Water Rate: | Pressure: |
|---|---|---|---|
| 100.00 sm3/min | 0.0i/min | 2100.0 l/min | 11745.82 kPaa |

FIG. 6A-C

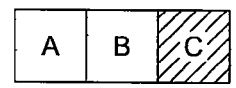

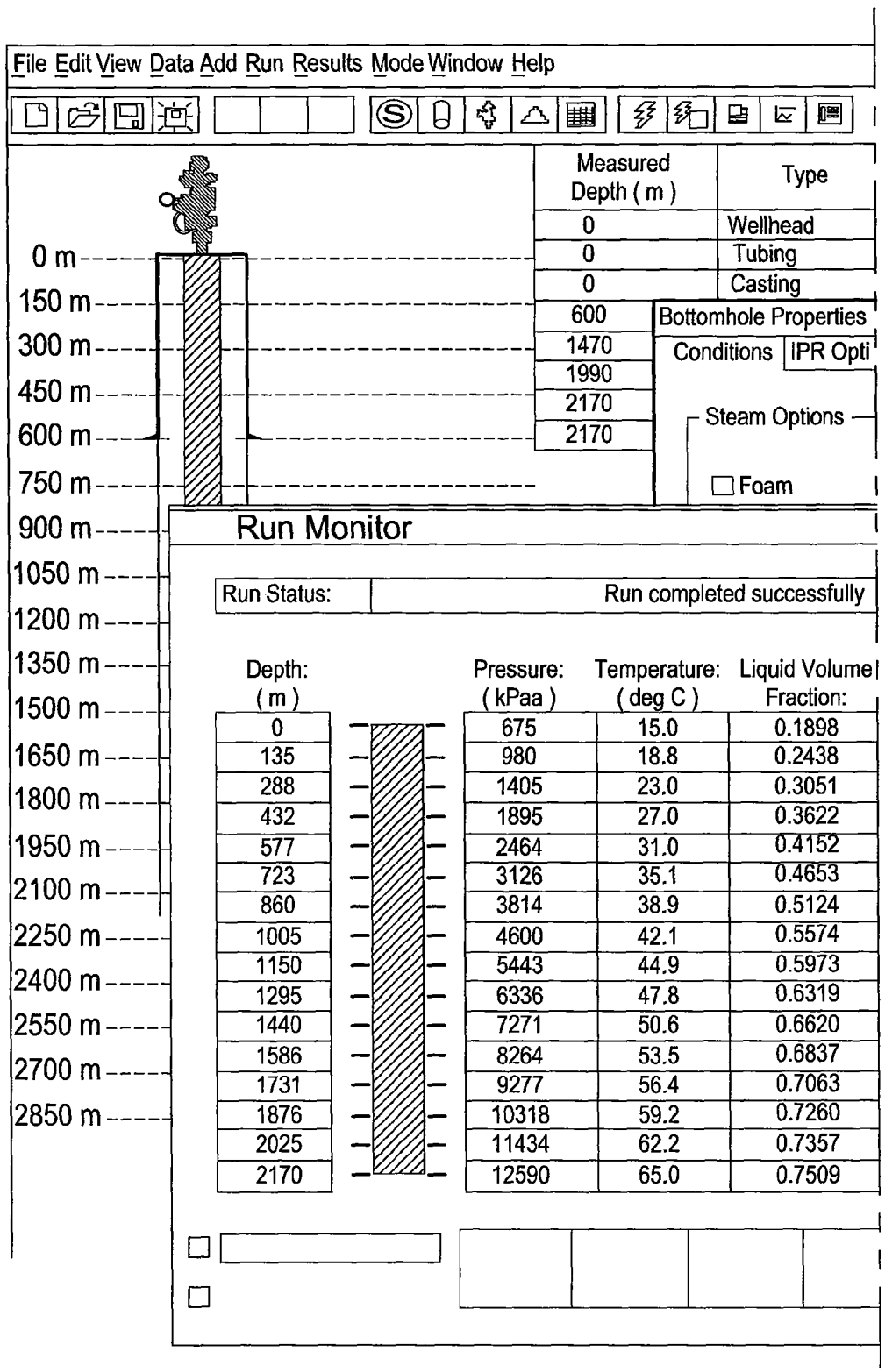
FIG. 6B-A

| Label | Information |
|---|---|
| Wellhead | N/A |
| Tubing #1 | ID: <empty> mm  OD: 12 |
| Production Casting #1 | ID: 315.30 mm  OD: <em | for Drill String Injection

| ons | Cuttings Transport | Fluid Stream | Limited Com |

Inflow Performance relationship

Specify Bottomhole pres

| Actual Gas Velocity (m/min) | Actual Liq.Velocity (m/min) | Flow Pattern: |
|---|---|---|
| 276.550 | 193.310 | Slug |
| 206.561 | 150.589 | Slug |
| 159.591 | 120.443 | Slug |
| 130.634 | 101.512 | Slug |
| 110.920 | 88.674 | Slug |
| 99.892 | 81.744 | Bubble Flow |
| 90.876 | 74.317 | Bubble Flow |
| 83.832 | 68.381 | Bubble Flow |
| 78.581 | 63.881 | Bubble Flow |
| 74.601 | 60.430 | Bubble Flow |
| 71.529 | 57.749 | Bubble Flow |
| 81.378 | 66.997 | Bubble Flow |
| 79.003 | 64.923 | Bubble Flow |
| 77.076 | 63.242 | Bubble Flow |
| 110.549 | 94.533 | Bubble Flow |
| 108.473 | 92.734 | Bubble Flow |

Basic   View   Plots   Exit

FIG. 6B-B

7 mm
pty> mm position sure and Flow Rate

Well Head Return Rates ( @ Insitu PT )

| Gas Rate: | HC Liq Rate: | Water Rate: | Pressure: |
|---|---|---|---|
| 100.00 sm3/min | 0.0 l/min | 2399.5 l/min | 675.4 kPaa |

Pressure Drop

| Friction: | HydroSt. Head: | Kinetic: | Total: |
|---|---|---|---|
| 488.9 kPa | 11425.7 kPa | 0.0 kPa | 11914.7 kPa |

| Gas Transit: | Liq Transit: | Liquid Holdup: | Motor ELV: |
|---|---|---|---|
| 22.4 min | 27.6 min | 66863.6 liters | 2979.7 l/min |

| No Horiz Liquid in System. | ECD: |
|---|---|
| V Min Liq: 57.382 m/min at 1462 m. (EL=0.6664) | 591.63 kg/m3 |

Additional Inflow ( @ STP )

| Gas Rate: | HC Liq Rate: | Water Rate: | Pressure: |
|---|---|---|---|
| 0.00 sm3/min | 0.0 l/min | 0.0 l/min | 0 kPaa |

Bottom Hole Injection Rates ( @ STP )

| Gas Rate: | HC Liq Rate: | Water Rate: | Pressure: |
|---|---|---|---|
| 100.00 sm3/min | 0.0 l/min | 2400.0 l/min | 12590.14 kPaa |

FIG. 6B-C

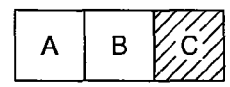

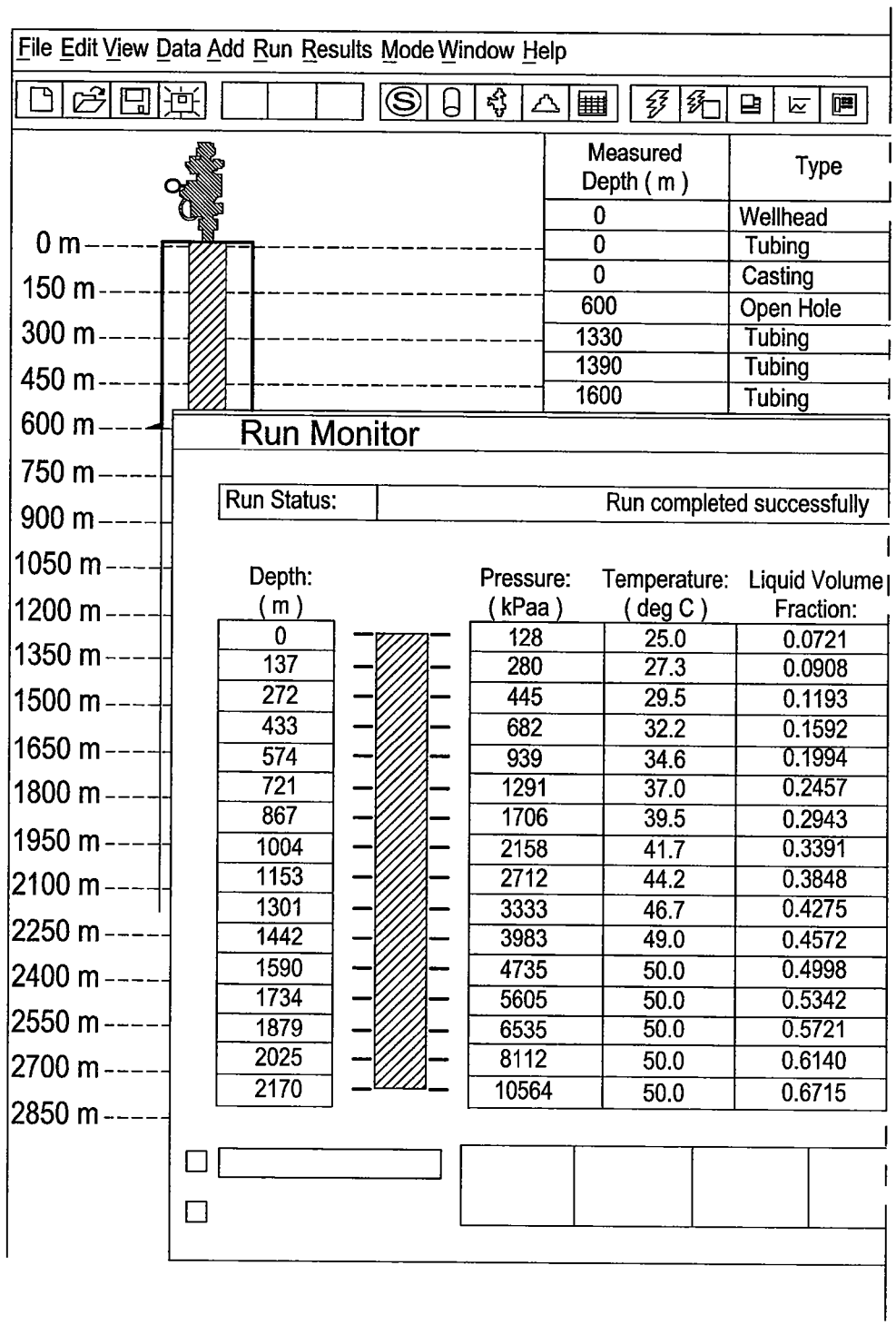
FIG. 6C-A

| Label | Information |
|---|---|
| Wellhead | N/A |
| Tubing | ID: <empty> mm  OD: 12 |
| Casting | ID: 315.00 mm  OD: <em |
| Casting | ID: 311.20 mm |
| Tubing | ID: <empty> mm  OD: 15 |
| Tubing | ID: <empty> mm  OD: 17 |
| Tubing | ID: <empty> mm  OD: 22 |

| Actual Gas Velocity (m/min) | Actual Liq.Velocity (m/min) | Flow Pattern: |
|---|---|---|
| 1471.080 | 447.361 | Bubble Flow |
| 668.629 | 355.371 | Slug |
| 441.776 | 270.557 | Slug |
| 308.077 | 202.922 | Slug |
| 236.861 | 162.136 | Slug |
| 190.526 | 135.607 | Slug |
| 155.133 | 113.288 | Slug |
| 131.852 | 98.406 | Slug |
| 113.695 | 86.794 | Slug |
| 100.107 | 78.190 | Slug |
| 106.400 | 87.552 | Bubble Flow |
| 97.314 | 80.111 | Bubble Flow |
| 133.501 | 113.358 | Bubble Flow |
| 124.559 | 105.832 | Bubble Flow |
| 263.452 | 233.995 | Bubble Flow |
| 239.928 | 213.851 | Bubble Flow |

Basic   View   Plots   Exit

FIG. 6C-B

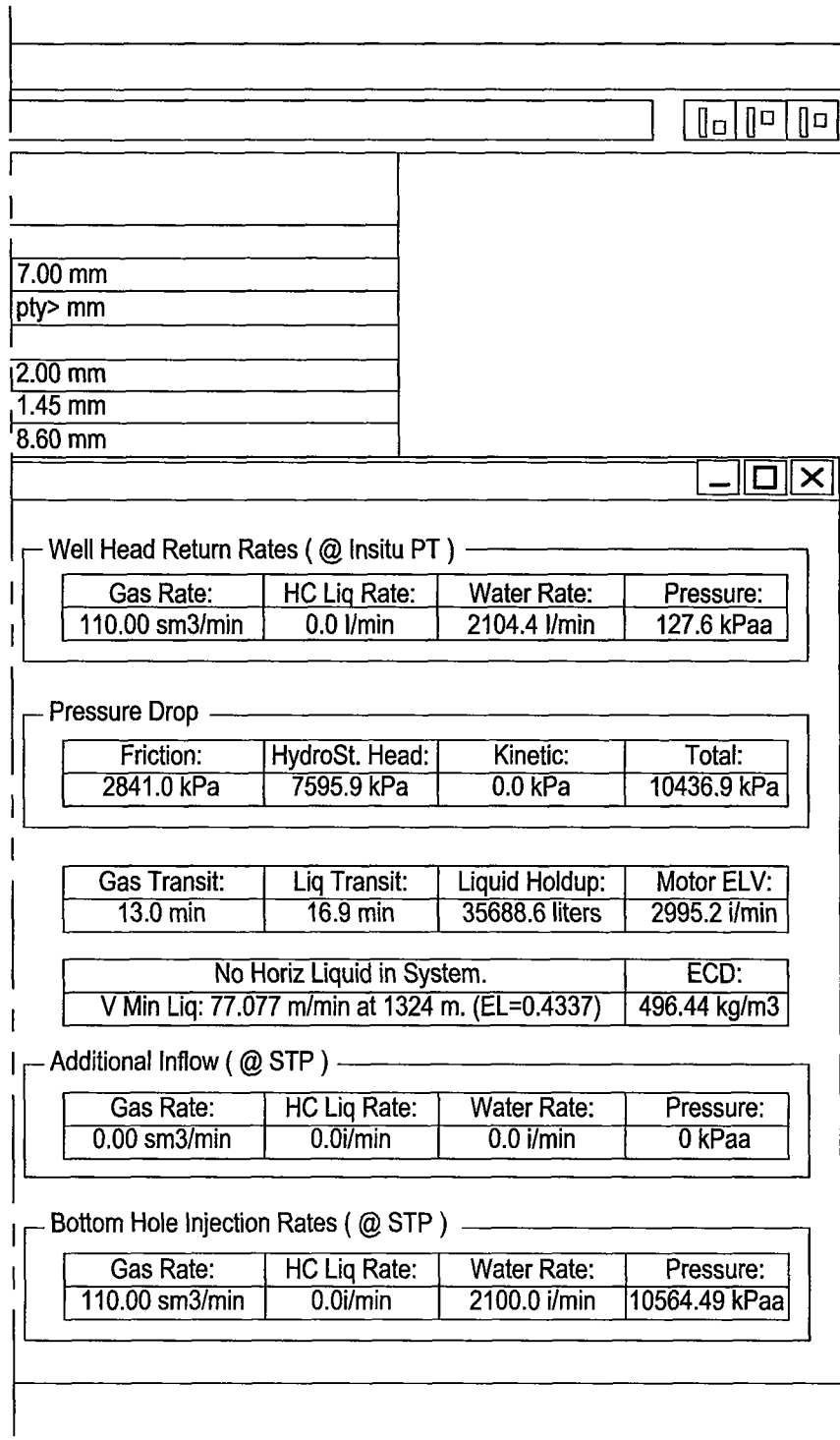
FIG. 6C-C

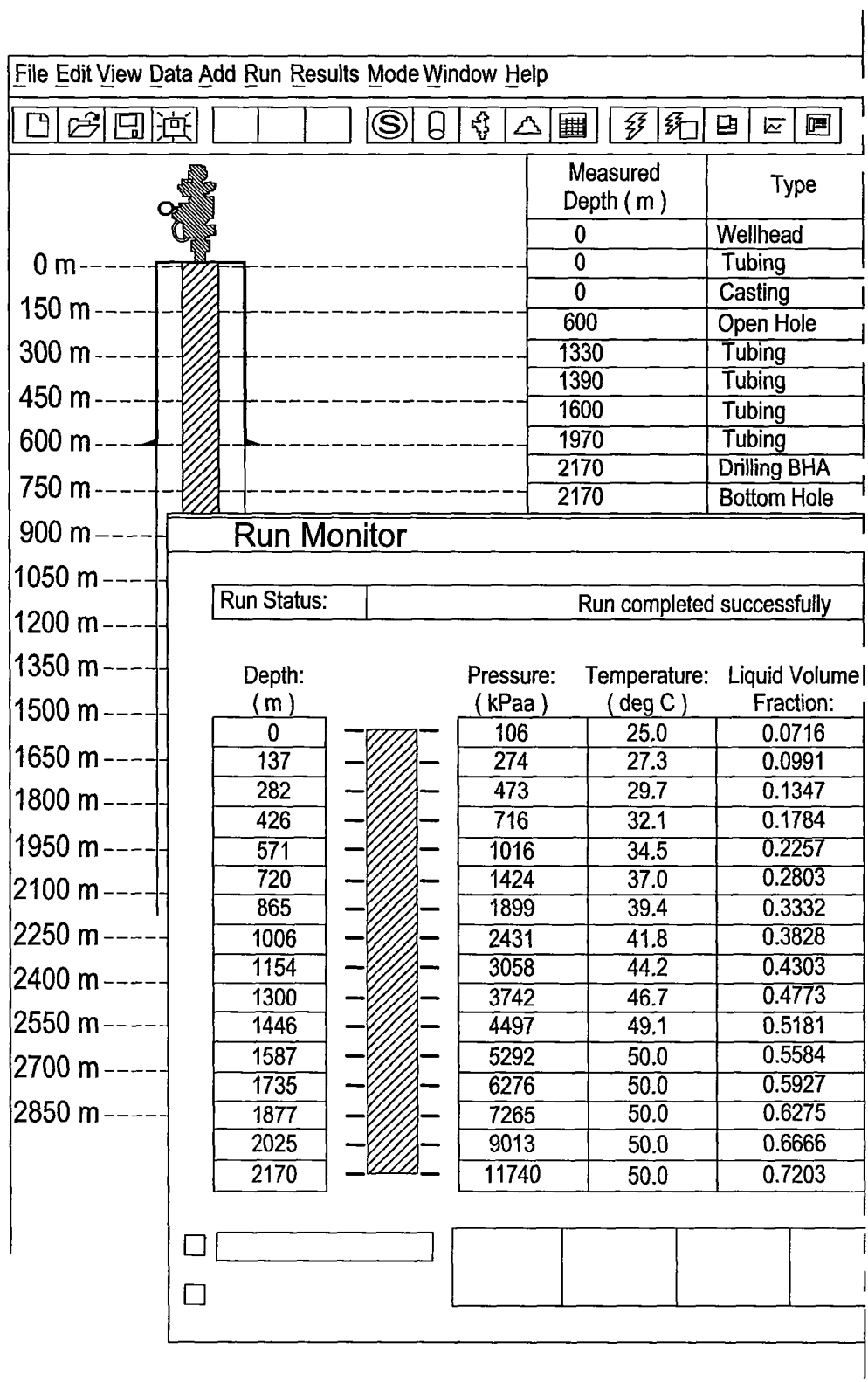
FIG. 6D-A

| Label | Information |
|---|---|
| Wellhead | N/A |
| Tubing | ID: <empty> mm  OD: 12 |
| Casting | ID: 315.00 mm  OD: <em |
| Casting | ID: 311.20 mm |
| Tubing | ID: <empty> mm  OD: 15 |
| Tubing | ID: <empty> mm  OD: 17 |
| Tubing | ID: <empty> mm  OD: 22 |
| Tubing | ID: <empty> mm  OD: 27 |
| BHA | N/A |
| Bottomhole | N/A |

| Actual Gas Velocity (m/min) | Actual Liq.Velocity (m/min) | Flow Pattern: |
|---|---|---|
| 1714.055 | 514.438 | Bubble Flow |
| 683.263 | 372.054 | Slug |
| 425.503 | 273.872 | Slug |
| 299.255 | 207.011 | Slug |
| 226.921 | 163.766 | Slug |
| 180.508 | 135.850 | Slug |
| 147.675 | 114.341 | Slug |
| 125.384 | 99.628 | Slug |
| 108.718 | 88.703 | Slug |
| 97.645 | 80.016 | Bubble Flow |
| 106.155 | 88.283 | Bubble Flow |
| 98.615 | 81.940 | Bubble Flow |
| 136.238 | 116.745 | Bubble Flow |
| 128.649 | 110.244 | Bubble Flow |
| 275.199 | 246.279 | Bubble Flow |
| 253.824 | 227.775 | Bubble Flow |

FIG. 6D-B

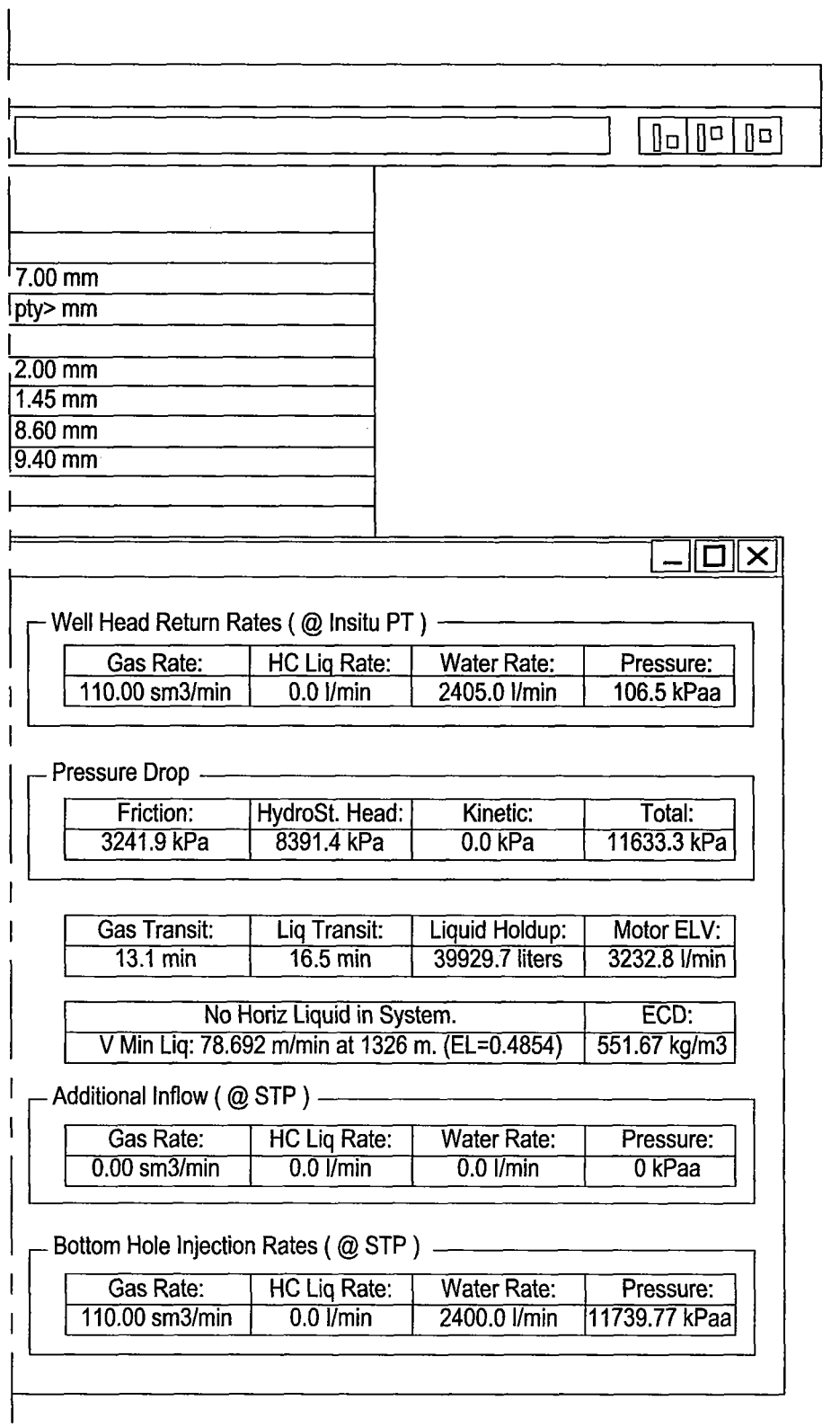
FIG. 6D-C 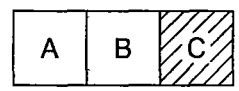

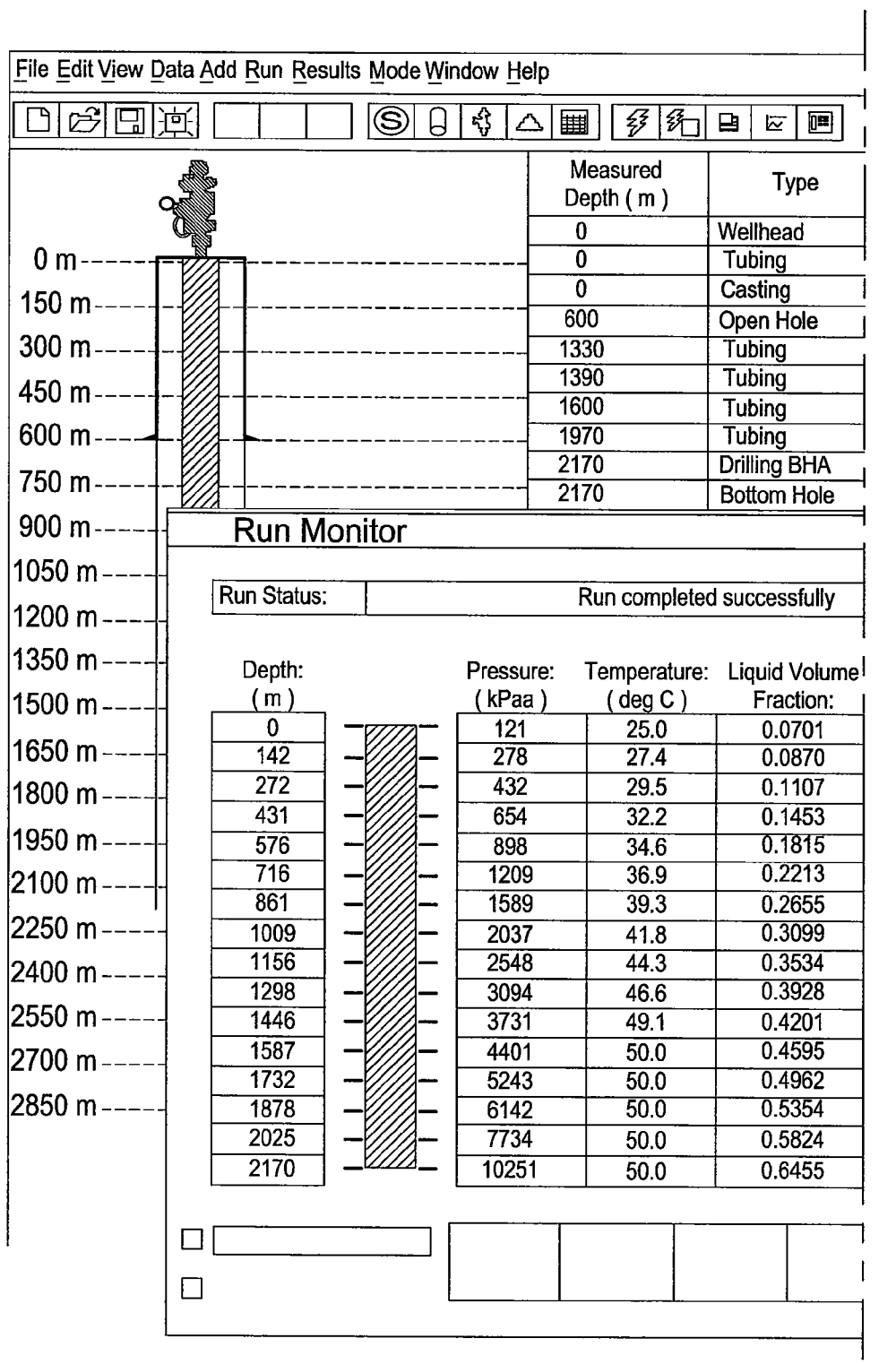
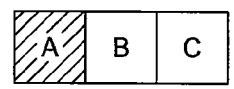
FIG. 6E-A

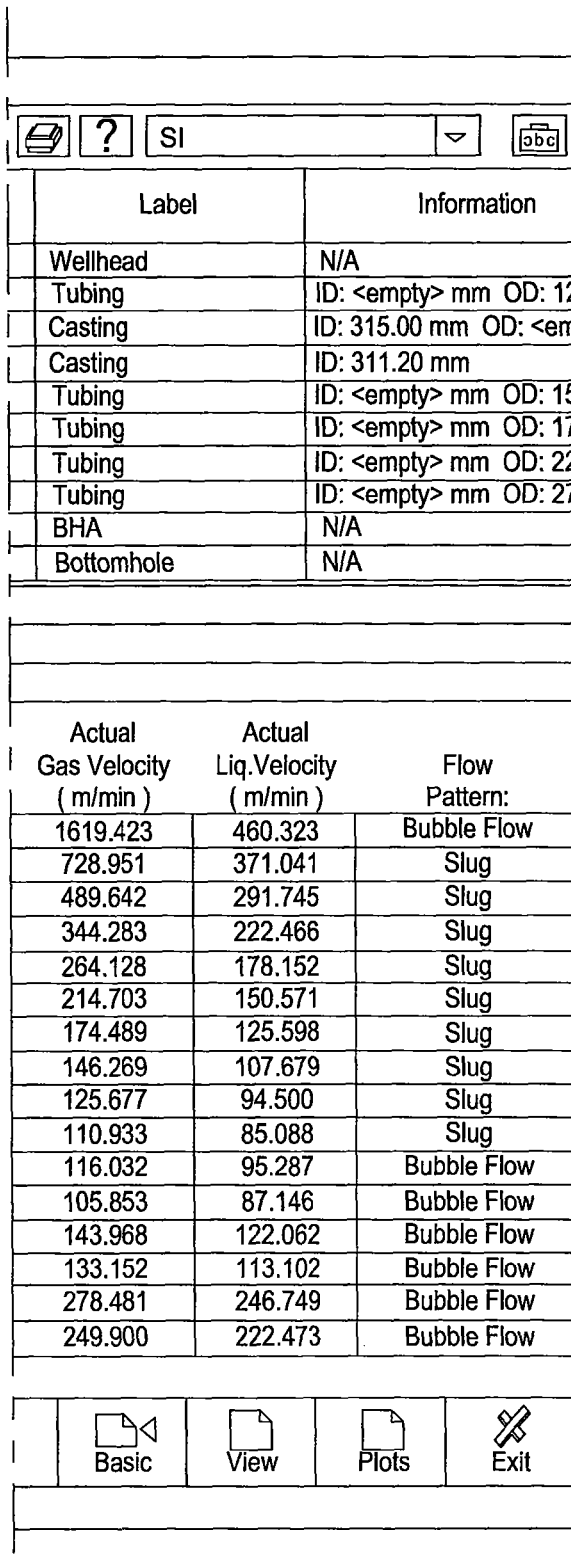
FIG. 6E-B

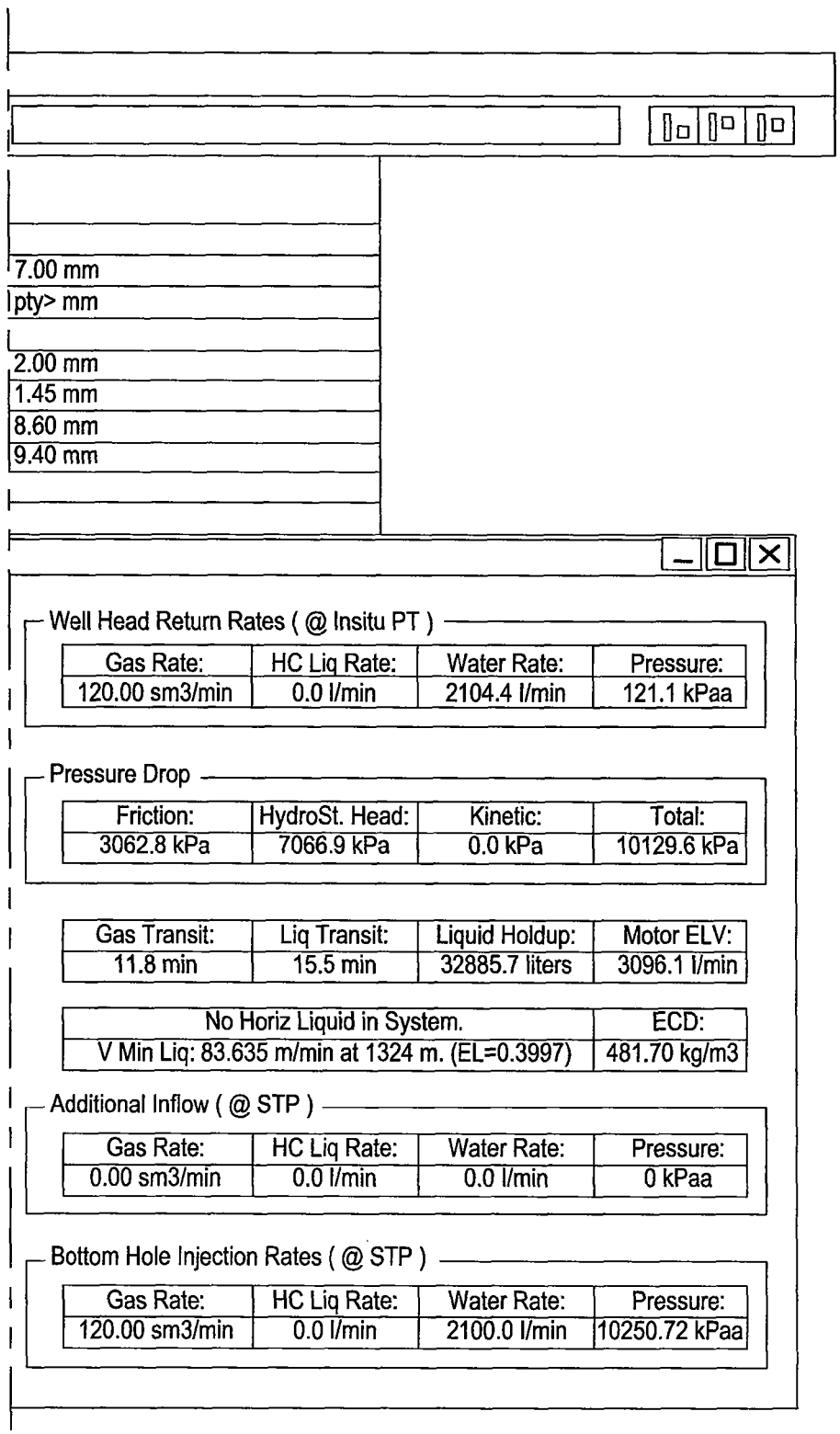
FIG. 6E-C
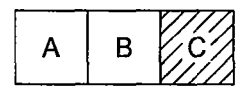

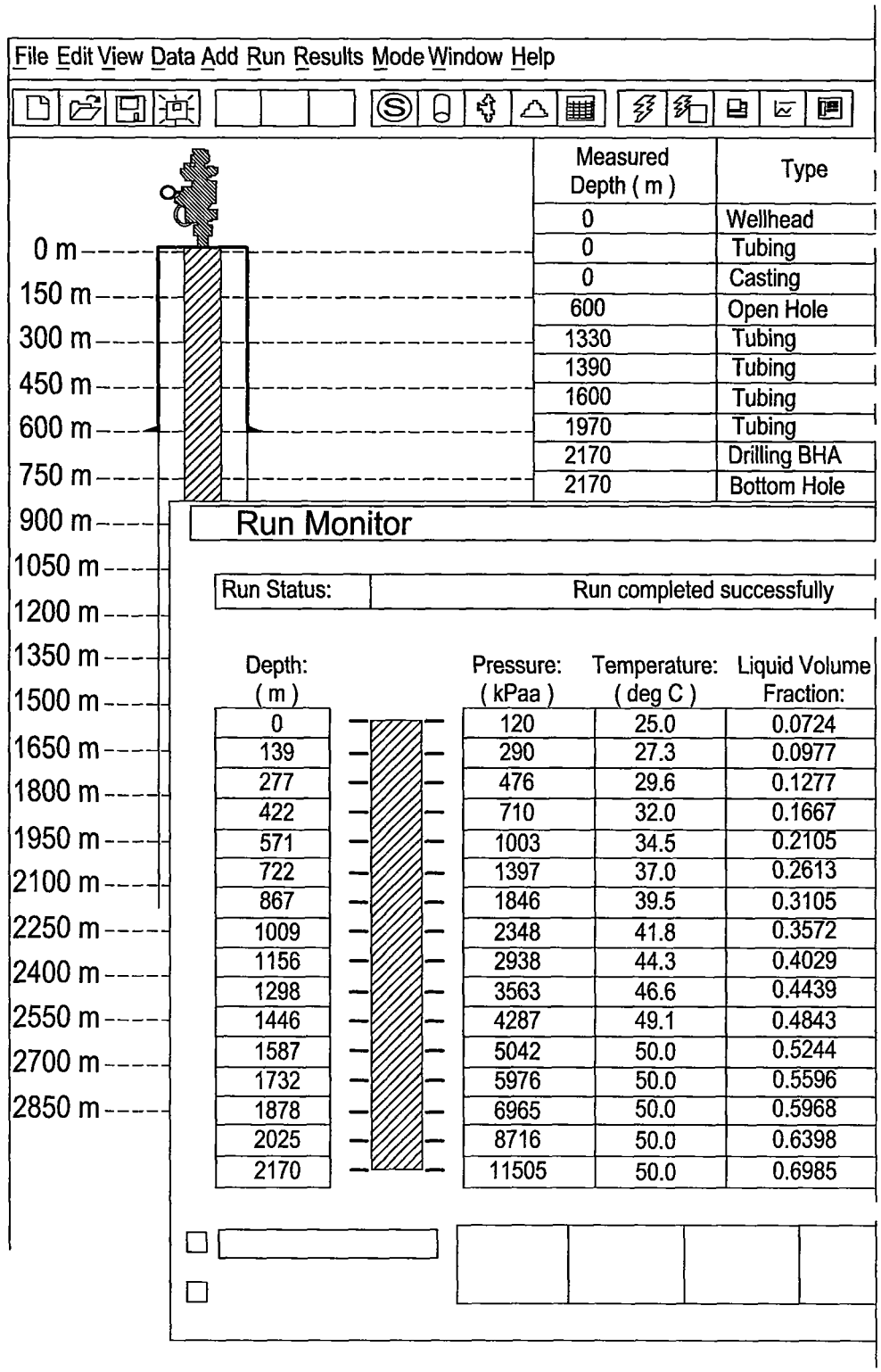
FIG. 6F-A
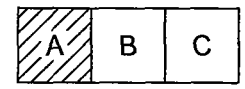

| Label | Information |
|---|---|
| Wellhead | N/A |
| Tubing | ID: <empty> mm OD: 12 |
| Casting | ID: 315.00 mm OD: <em |
| Casting | ID: 311.20 mm |
| Tubing | ID: <empty> mm OD: 15 |
| Tubing | ID: <empty> mm OD: 17 |
| Tubing | ID: <empty> mm OD: 22 |
| Tubing | ID: <empty> mm OD: 27 |
| BHA | N/A |
| Bottomhole | N/A |

| Actual Gas Velocity ( m/min ) | Actual Liq.Velocity ( m/min ) | Flow Pattern: |
|---|---|---|
| 1652.380 | 508.690 | Bubble Flow |
| 704.184 | 377.606 | Slug |
| 457.350 | 288.897 | Slug |
| 324.886 | 221.530 | Slug |
| 264.012 | 175.529 | Slug |
| 195.735 | 145.713 | Slug |
| 160.355 | 122.724 | Slug |
| 136.118 | 106.753 | Slug |
| 117.866 | 94.726 | Slug |
| 105.037 | 86.052 | Bubble Flow |
| 113.566 | 94.448 | Bubble Flow |
| 104.878 | 87.255 | Bubble Flow |
| 144.370 | 123.673 | Bubble Flow |
| 135.239 | 115.933 | Bubble Flow |
| 287.210 | 256.633 | Bubble Flow |
| 261.974 | 234.905 | Bubble Flow |

FIG. 6F-B

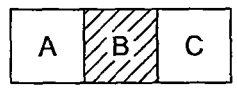

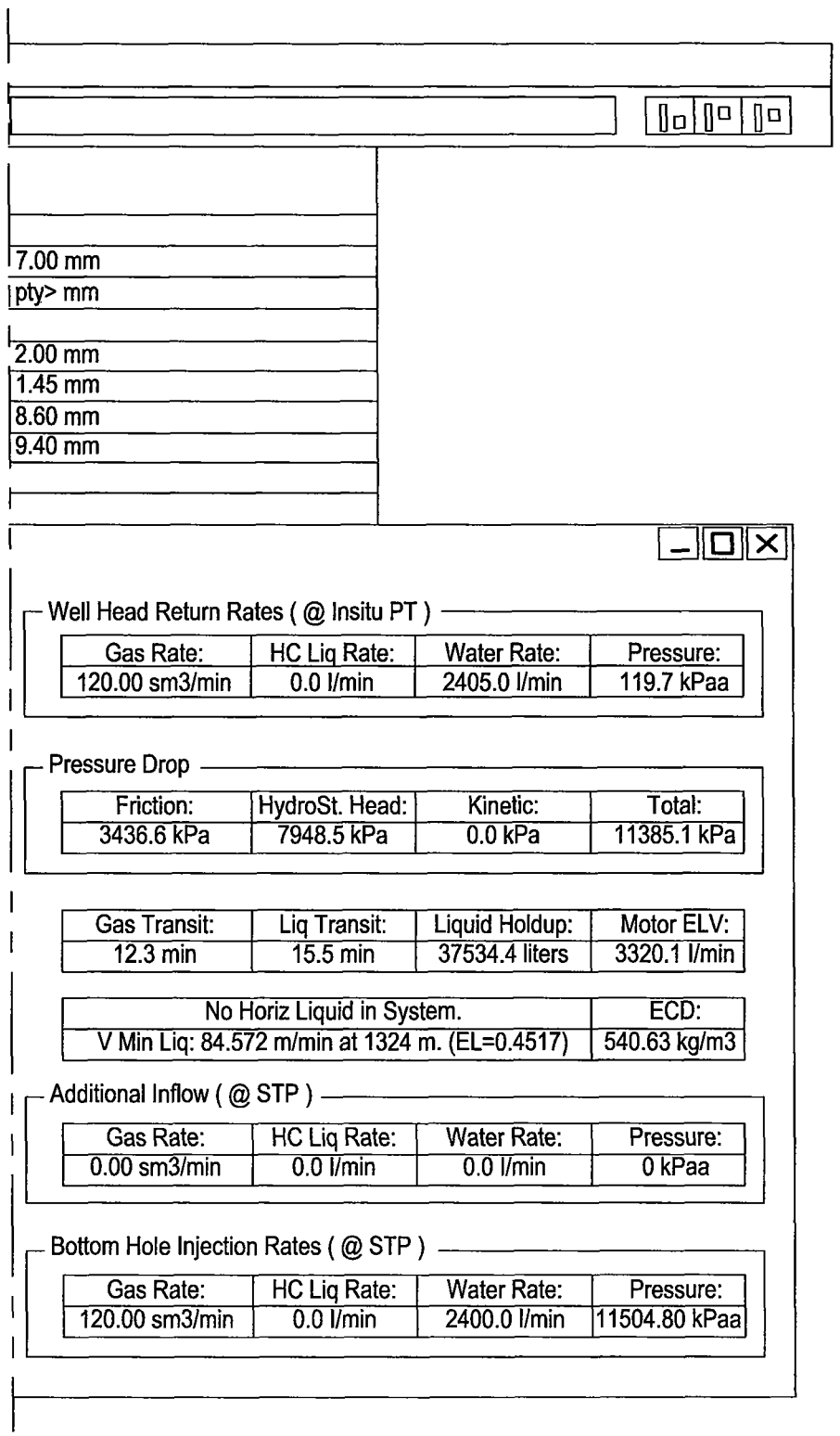
FIG. 6F-C
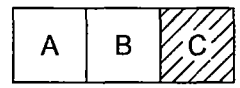

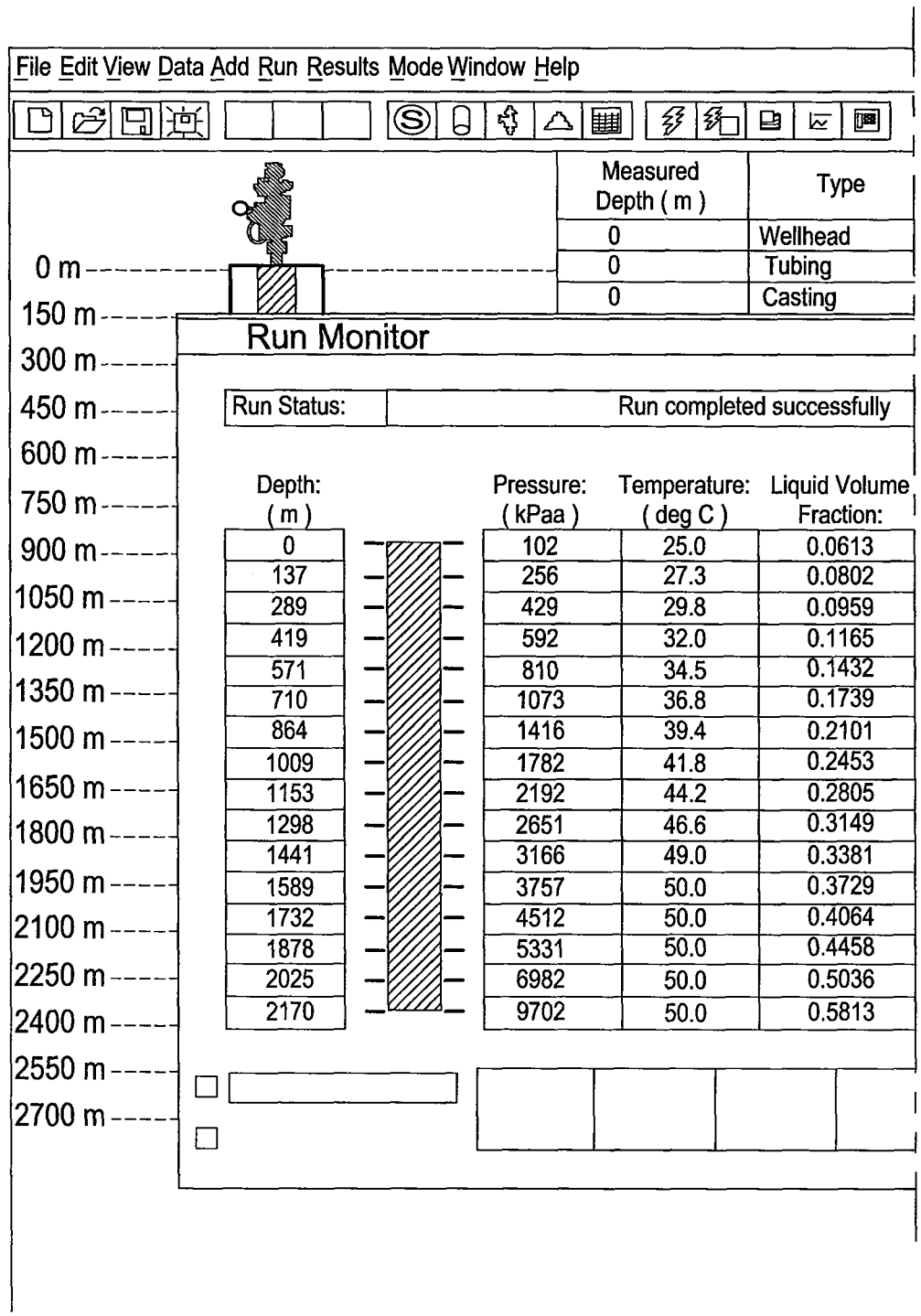
FIG. 6G-A

| Label | Information |
|---|---|
| Wellhead | N/A |
| Tubing | ID: <empty> mm OD: 12 |
| Casting | ID: 315.00 mm OD: <em |
| Actual Gas Velocity (m/min) | Actual Liq.Velocity (m/min) | Flow Pattern: |
|---|---|---|
| 2355.309 | 526.183 | Annular-Mist |
| 979.617 | 402.171 | Slug |
| 608.371 | 336.854 | Slug |
| 456.465 | 277.343 | Slug |
| 350.409 | 225.777 | Slug |
| 283.960 | 191.608 | Slug |
| 227.884 | 158.685 | Slug |
| 190.983 | 136.052 | Slug |
| 163.946 | 119.060 | Slug |
| 143.676 | 106.155 | Slug |
| 149.957 | 118.413 | Slug |
| 133.625 | 107.400 | Slug |
| 177.672 | 149.060 | Bubble Flow |
| 160.909 | 135.855 | Bubble Flow |
| 324.999 | 285.406 | Bubble Flow |
| 287.779 | 247.107 | Bubble Flow |
Basic  View  Plots  Exit
FIG. 6G-B

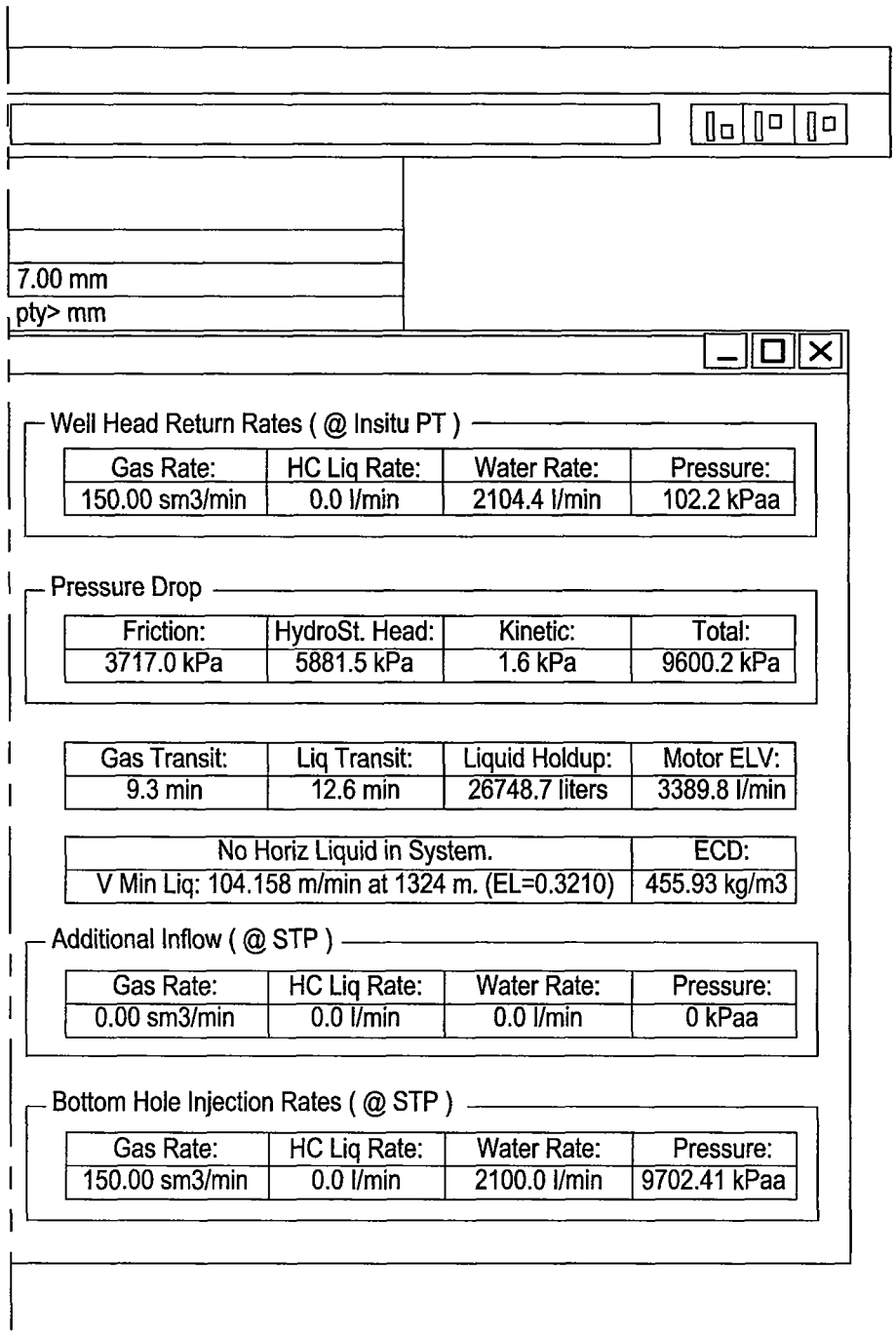

| Well Head Return Rates ( @ Insitu PT ) | | | |
|---|---|---|---|
| Gas Rate: | HC Liq Rate: | Water Rate: | Pressure: |
| 150.00 sm3/min | 0.0 l/min | 2104.4 l/min | 102.2 kPaa |

| Pressure Drop | | | |
|---|---|---|---|
| Friction: | HydroSt. Head: | Kinetic: | Total: |
| 3717.0 kPa | 5881.5 kPa | 1.6 kPa | 9600.2 kPa |

| Gas Transit: | Liq Transit: | Liquid Holdup: | Motor ELV: |
|---|---|---|---|
| 9.3 min | 12.6 min | 26748.7 liters | 3389.8 l/min |

| No Horiz Liquid in System. | ECD: |
|---|---|
| V Min Liq: 104.158 m/min at 1324 m. (EL=0.3210) | 455.93 kg/m3 |

| Additional Inflow ( @ STP ) | | | |
|---|---|---|---|
| Gas Rate: | HC Liq Rate: | Water Rate: | Pressure: |
| 0.00 sm3/min | 0.0 l/min | 0.0 l/min | 0 kPaa |

| Bottom Hole Injection Rates ( @ STP ) | | | |
|---|---|---|---|
| Gas Rate: | HC Liq Rate: | Water Rate: | Pressure: |
| 150.00 sm3/min | 0.0 l/min | 2100.0 l/min | 9702.41 kPaa |

FIG. 6G-C

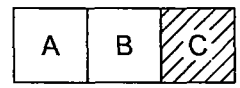

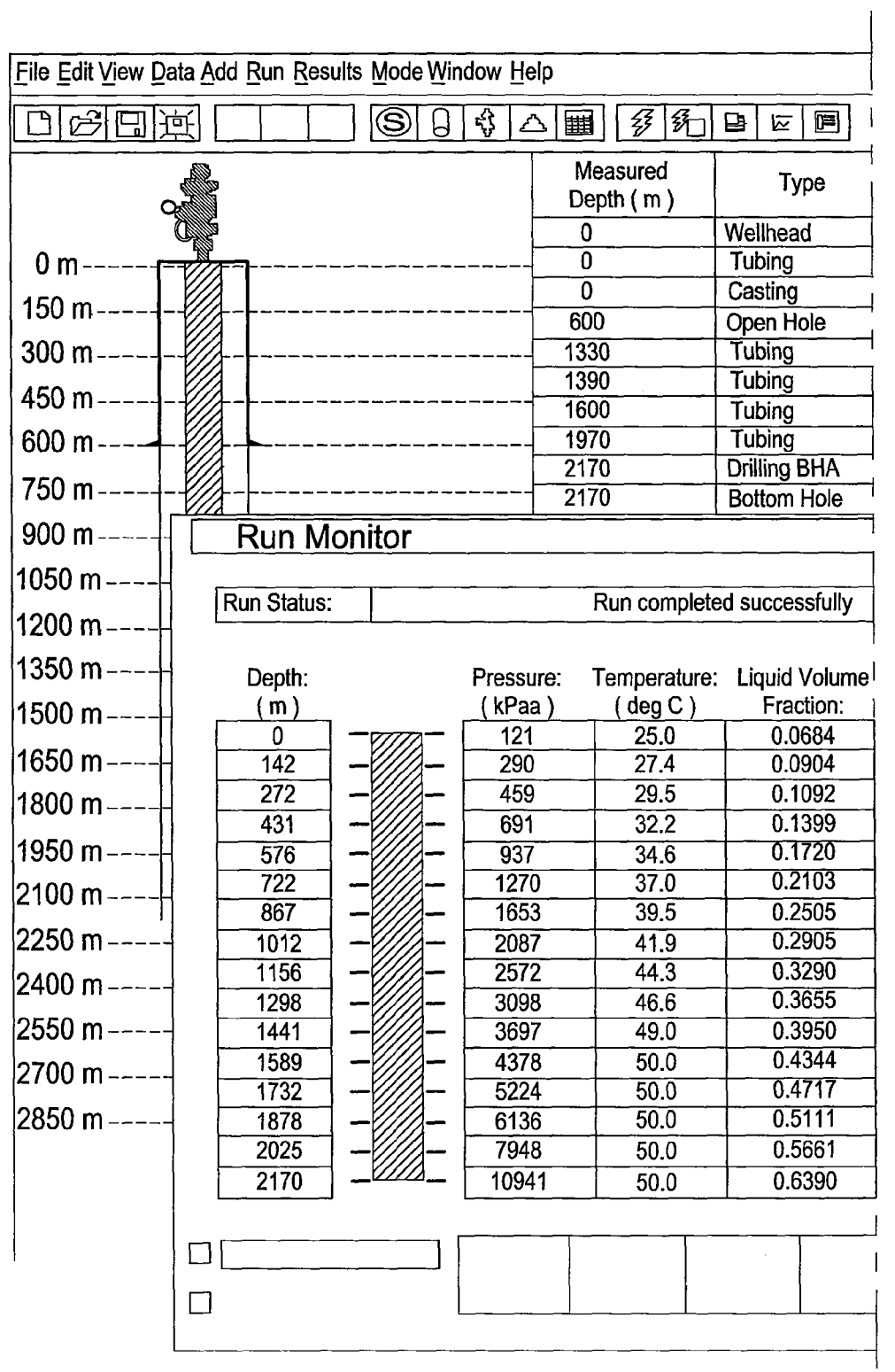
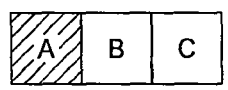
FIG. 6H-A

| Label | Information |
|---|---|
| Wellhead | N/A |
| Tubing | ID: <empty> mm  OD: 12 |
| Casting | ID: 315.00 mm  OD: <em |
| Casting | ID: 311.20 mm |
| Tubing | ID: <empty> mm  OD: 15 |
| Tubing | ID: <empty> mm  OD: 17 |
| Tubing | ID: <empty> mm  OD: 22 |
| Tubing | ID: <empty> mm  OD: 27 |
| BHA | N/A |
| Bottomhole | N/A |

| Actual Gas Velocity ( m/min ) | Actual Liq.Velocity ( m/min ) | Flow Pattern: |
|---|---|---|
| 2016.134 | 538.888 | Bubble Flow |
| 872.429 | 408.079 | Slug |
| 575.773 | 337.777 | Slug |
| 405.199 | 264.000 | Slug |
| 312.861 | 214.873 | Slug |
| 251.995 | 181.035 | Slug |
| 205.553 | 152.092 | Slug |
| 173.265 | 131.284 | Slug |
| 149.968 | 116.011 | Slug |
| 132.538 | 104.516 | Slug |
| 140.302 | 115.815 | Bubble Flow |
| 126.965 | 105.358 | Bubble Flow |
| 172.224 | 146.751 | Bubble Flow |
| 158.320 | 135.392 | Bubble Flow |
| 326.625 | 290.078 | Bubble Flow |
| 287.289 | 256.822 | Bubble Flow |

Basic   View   Plots   Exit

FIG. 6H-B

7.00 mm
pty> mm 2.00 mm
1.45 mm
8.60 mm
9.40 mm

Well Head Return Rates ( @ Insitu PT )

| Gas Rate: | HC Liq Rate: | Water Rate: | Pressure: |
|---|---|---|---|
| 150.00 sm3/min | 0.0 l/min | 2405.0 l/min | 120.9 kPaa |

Pressure Drop

| Friction: | HydroSt. Head: | Kinetic: | Total: |
|---|---|---|---|
| 4067.5 kPa | 6752.5 kPa | 0.0 kPa | 10820.0 kPa |

| Gas Transit: | Liq Transit: | Liquid Holdup: | Motor ELV: |
|---|---|---|---|
| 9.9 min | 12.9 min | 31171.4 liters | 3587.3 l/min |

| No Horiz Liquid in System. | ECD: |
|---|---|
| V Min Liq: 102.726 m/min at 1324 m. (EL=0.3719) | 514.13 kg/m3 |

Additional Inflow ( @ STP )

| Gas Rate: | HC Liq Rate: | Water Rate: | Pressure: |
|---|---|---|---|
| 0.00 sm3/min | 0.0 l/min | 0.0 l/min | 0 kPaa |

Bottom Hole Injection Rates ( @ STP )

| Gas Rate: | HC Liq Rate: | Water Rate: | Pressure: |
|---|---|---|---|
| 150.00 sm3/min | 0.0 l/min | 2400.0 l/min | 10940.95 kPaa |

FIG. 6H-C 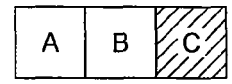

MULTIPHASE DRILLING SYSTEMS AND METHODS

CROSS-REFERENCE TO RELATED APPLICATIONS

This application claims benefit of U.S. Prov. Pat. App. No. 61/159,176, filed Mar. 11, 2009, and U.S. Prov. Pat. App. No. 61/089,456, filed Aug. 15, 2008, both of which are herein incorporated by reference in their entireties.

BACKGROUND OF THE INVENTION

1. Field of the Invention

The present invention relates to multiphase drilling systems and methods.

2. Description of the Related Art

Drilling a wellbore typically requires circulating a drilling fluid to flush the bore of cuttings produced by action of a rotating drill bit. The drilling fluid may be pumped down the well inside the drill string and through the bit and jetted into the cutting face where it assists in penetrating the fractures created by the bit, lifting the bit fractured chips by penetrating the fractures and hydraulically lifting the chips into the circulating fluid stream. The drilling fluid then carries the chips up the lower annulus formed between an outer surface of the drill string and a wall of the wellbore. The drilling fluid and chips or returns continue up the upper annulus formed between a casing or lining and the drill string and to the surface where the chips are separated from the fluid. The cleaned fluid is then reintroduced to the well completing the circulation cycle. The drilling fluid may also cool the drill bit and support the wall of the wellbore.

Deploying a drilling rig to a wellsite is an expensive task. Oil and gas companies are constantly searching for ways to reduce time spent by the drilling rig at the wellsite. The rig time includes time spent drilling/tripping and non-productive time. The time spent drilling may be reduced by increasing a rate of penetration (ROP) of the drill bit through the rock formations, especially non-productive formations between the surface and the deeper hydrocarbon-bearing formations.

Primary factors which govern ROP include: bit type, weight on bit (WOB), rotary speed of the bit, formation characteristics, and a bottom hole pressure (BHP) exerted by the returns on the formation being drilled. The BHP includes a static component generated by the hydrostatic fluid column weight and a dynamic component generated by hydraulic drag due to naturally occurring resistance to flow through the annulus. The influence of BHP on the ROP is often discussed in terms of chip hold down effect. An increase in BHP tends to compact the rock formation being drilled, artificially increasing the shear strength of the rock and tending to hold rock chips created by the bit in place (chip hold down effect) thereby forcing re-drilling/re-fracturing of previously drilled rock and reducing the ROP. An increase in BHP also increases downtime by shortening the life of the bit, thereby requiring more frequent replacement or tripping of the drill bit.

To increase the ROP, drillers in many hard rock drilling areas have turned to using air for drilling fluid. As compared to conventional drilling mud, typically oil or water based, the density is reduced by orders of magnitude, thereby greatly reducing BHP, improving ROP and extending the life of the drill bit. However, air drilling is limited to select geological formations, which are consolidated with minimal water influx and do not produce hydrogen sulfide. Therefore, there exists a need in the art for a method of drilling a wellbore that increases ROP, improves the life of the drill bit, and does not suffer from the limitations of air drilling.

SUMMARY OF THE INVENTION

In one embodiment, a method for drilling a wellbore includes injecting drilling fluid through a drill string disposed in the wellbore and rotating a drill bit disposed on a bottom of the drill string. The drilling fluid includes a liquid and a gas. The drilling fluid is injected at the surface. The drilling fluid exits the drill bit and carries cuttings from the drill bit. The drilling fluid and cuttings (returns) flow to the surface via an annulus formed between the drill string and the wellbore. The liquid is injected at a rate so that a liquid velocity of the returns in the annulus is sufficient to transport the cuttings. The method further includes drilling through at least a portion of a non-productive formation.

In another embodiment, a method for drilling a wellbore includes injecting drilling fluid through a drill string disposed in the wellbore and rotating a drill bit disposed on a bottom of the drill string. The drilling fluid includes a liquid and a gas. The drilling fluid is injected at the surface. The drilling fluid exits the drill bit and carries cuttings from the drill bit. The drilling fluid and cuttings (returns) flow to the surface via an annulus formed between the drill string and the wellbore. A liquid volume fraction of the drilling fluid at standard temperature and pressure is greater than or equal to 0.01. The method further includes drilling through at least a portion of a non-productive formation.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 3A is a table illustrating intervals of the wellbore drilled with conventional methods and embodiments of the present invention. FIG. 3B is a table illustrating intervals of other wellbores in the same field drilled with embodiments of the present invention. FIG. 3C is a table illustrating motors used with embodiments of the present invention. FIG. 3D illustrates ROPs of similar intervals in the same field air drilled.

FIG. 4A is a table of intervals of the wellbore drilled with conventional methods and embodiments of the present invention. FIG. 4B is a table of some of the geological formations traversed by the wellbore. FIG. 4C is a table illustrating intervals of other wellbores in the same field drilled with embodiments of the present invention. FIG. 4D is a table illustrating motors used with embodiments of the present invention.

FIG. 5A is a table of intervals of the wellbore drilled with conventional methods and embodiments of the present invention. FIG. 5B is a table of geological formations traversed by the wellbore. FIG. 5C is a table illustrating an interval of another wellbore in the same field drilled with an embodiment of the present invention. FIG. 5D is a table illustrating motors used with embodiments of the present invention.

FIGS. 6A-6H are tables illustrating simulated annulus profiles of drilling a wellbore while varying gas injection rate and liquid/mud injection rate, according to other embodiments of the present invention.

DETAILED DESCRIPTION

Figure 1A:
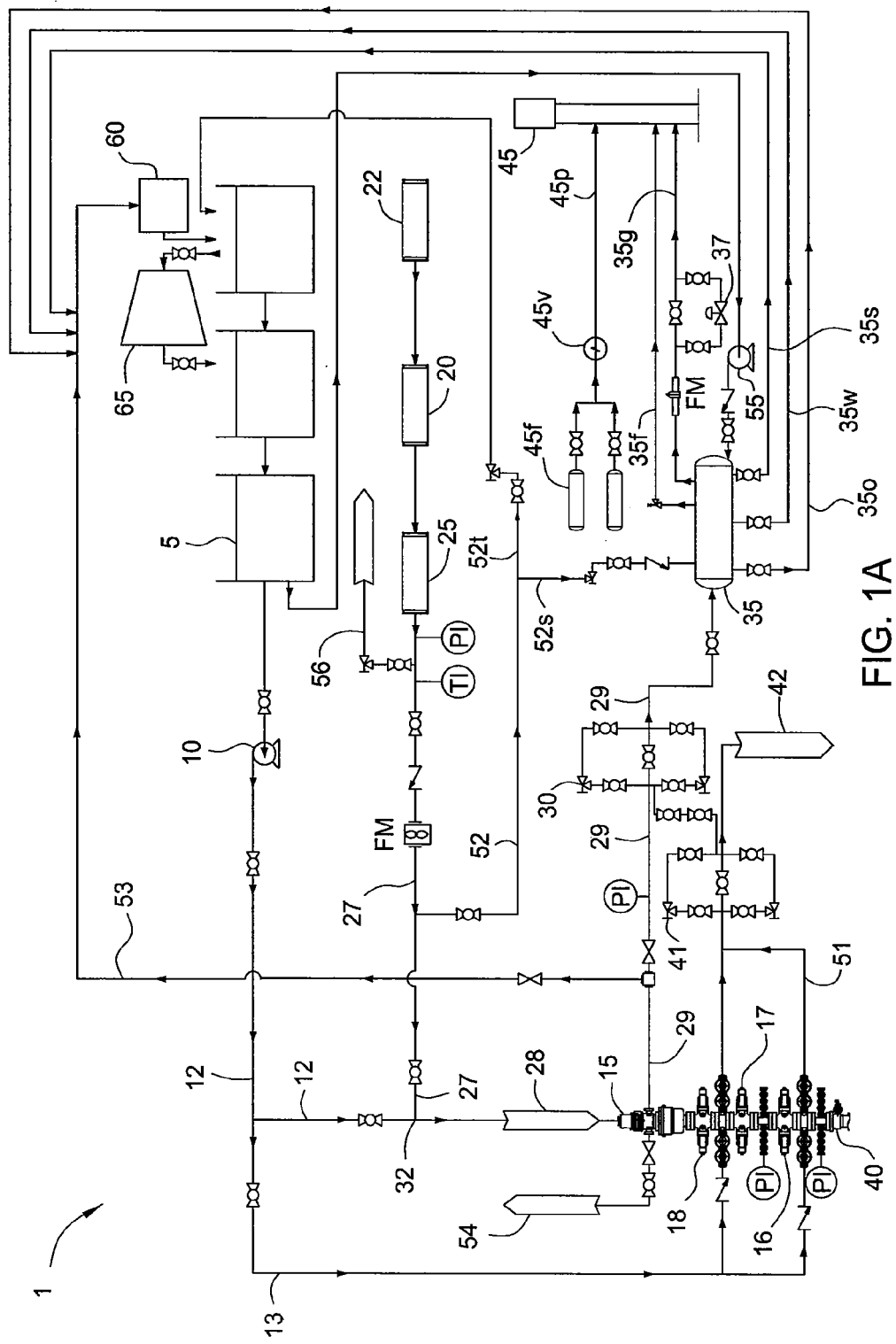
FIG. 1A is a flow diagram of a drilling system, according to one embodiment of the present invention.
Figure 1B:
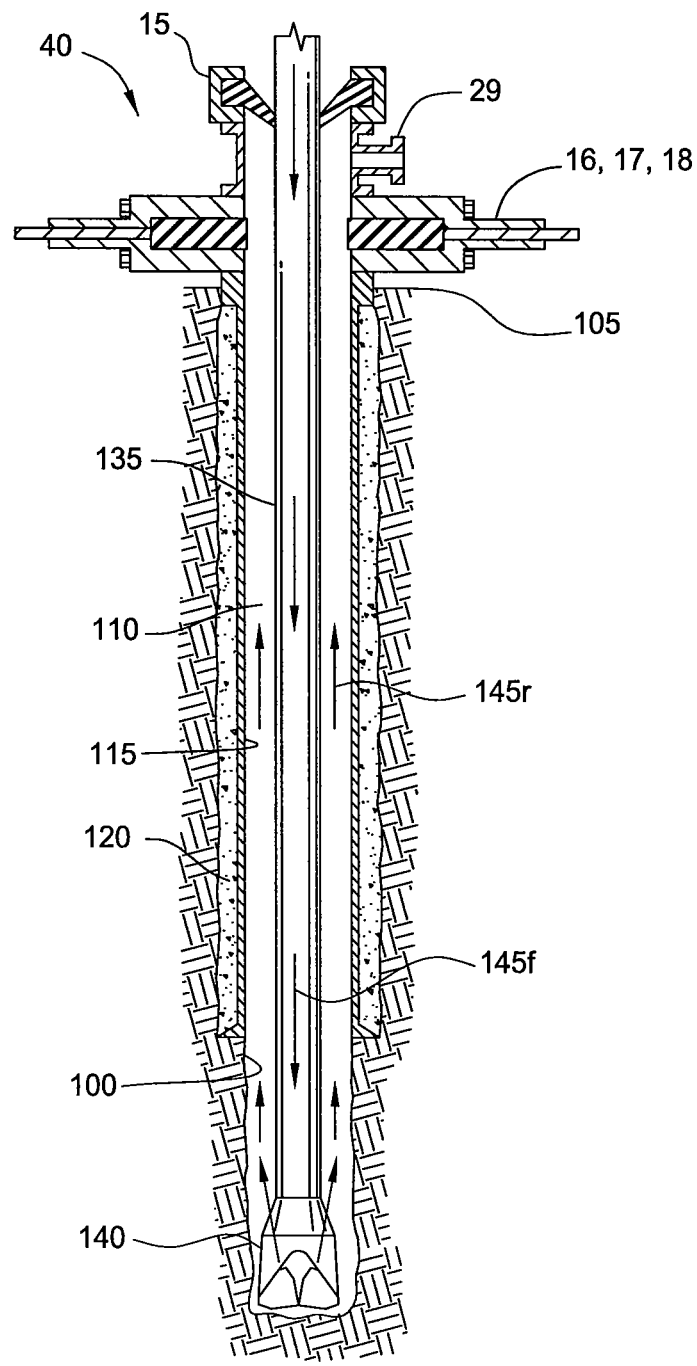
FIG. 1B is a cross-section of a wellbore being drilled with the drilling system.

FIG. 1A is a flow diagram of a drilling system 1, according to one embodiment of the present invention. FIG. 1B is a cross-section of a wellbore 100 being drilled using the drilling system 1. The drilling system 1 may be deployed on land or offshore. The drilling system 1 may include a drilling rig (not shown) used to support drilling operations. The drilling rig may include a derrick supported from a support structure having a rig floor or platform on which drilling operators may work. Many of the components used on the rig, such as a Kelly and rotary table or top drive, power tongs, slips, draw works and other equipment, are not shown for ease of depiction. A wellbore 100 has already been partially drilled, casing 115 set and cemented 120 into place. The casing string 115 extends from the surface 105 of the wellbore 100 where a wellhead 40 is typically located. Drilling fluid 145$f$ may be injected through a drill string 135 deployed in the wellbore.

The drilling fluid 145$f$ may be a mixture and may include a first fluid which is a gas 145$g$ (see FIG. 2A) at standard temperature and pressure (STP, 60° F., 14.7 psia) and a second fluid which is a liquid 145$\ell$ (see FIG. 2A) at STP. The mixture may be heterogeneous (i.e., insoluble) or homogenous (i.e., a solution) and may vary in properties (i.e., density and/or phases) in response to temperature and/or pressure. The liquid 145$\ell$ may be water, glycerol, glycol, or base oil, such as kerosene, diesel, mineral oil, fuel oil, vegetable ester, linear alpha olefin, internal olefin, linear paraffin, crude oil, or combinations thereof. The gas 145$g$ may be any gas having an oxygen concentration less than the oxygen concentration sufficient for combustion (i.e., eight percent), such as nitrogen, natural gas, or carbon dioxide. The nitrogen may be generated at the surface using a nitrogen production unit (NPU) 20 which may generate substantially pure (i.e., greater than or equal to ninety-five percent pure) nitrogen. Alternatively, the nitrogen may be delivered from cryogenic bottles or bulk tanks. The gas 145$g$ may be a mixture of gases, such as exhaust gas from the rig's prime mover or fuel-gas driven compressors or a mixture of nitrogen, natural gas, and/or carbon dioxide.

The liquid 145$\ell$ may be mud (have solids suspended and/or dissolved therein). The mud may be oil-based and may have water emulsified therein (invert emulsion). The solids may include an organophilic clay, lignite, and/or asphalt. The base oil may be viscosified. Alternatively, the mud may be water-based. The solids may be dissolved in the liquid, forming a solution, such as brine. The dissolved solids may include metal halides, such as potassium, cesium, or calcium salts or mixtures thereof; or formates, such as cesium, sodium, potassium, lithium, or mixtures thereof. The brine may further include silicates, amines, oils, such as distillated hydrocarbons, olefins, or paraffins. The brine may further include hydration and dispersion inhibiting polymers, such as polyanionic cellulose (PAC), partially hydrolyzed polyacrylamide (PHPA), partially hydrolyzed polyacylanitrile (PH-PAN) fluids).

Alternatively, the mud may be glycol based as discussed in U.S. Pat. No. 6,291,405, which is hereby incorporated by reference in its entirety. The glycol-based mud may include a water-miscible glycol, with a molecular weight of less than about two hundred, such as ethylene glycol, diethylene glycol, triethylene glycol, propylene glycol, butylene glycol and mixtures thereof, at a concentration: of at least 70%, 70% to 100%, 80% to 100%, or 85% to 100%, (by volume); water, not in excess of 30% by volume; a salt or salts selected from the group consisting of sodium chloride, potassium chloride, magnesium chloride, calcium chloride, sodium bromide, calcium bromide, potassium acetate, potassium formate and choline chloride at a concentration greater than 50,000 mg/liter of water in the mud; an anti-sticking additive at a concentration of greater than 0.5% by weight of the mud; a filtration control agent for lowering fluid loss of the drilling fluid; a viscosifier for suspension of solids and weighting material in the drilling fluid, such as glycol-soluble gums, polymers or gels, or with rod-like clays such as attapulgite or sepiolite; and weighting material, such as barite, iron oxide, dolomite, calcium carbonate or soluble salts.

Alternatively, the mud may be an oil in water emulsion as discussed in U.S. Pat. No. 4,411,801, which is hereby incorporated by reference in its entirety. The mud may include an emulsifying amount of an emulsifier, such as one or more surfactants, such as three surfactants in equal parts, such as polyoxyethylene glycol five hundred mono-tallate which is, generally, the mono esters of tall oil fatty acids and mixed polyoxyethelene diols having an average polymer length of about four hundred fifty to five hundred fifty oxyethylene (EtO) units, a nonyl pheno ethoxylate containing about 43% by weight EtO groups, and a nonyl phenol ethoxylate containing 65% by weight EtO groups; a liquid hydrocarbon coating agent, being present in an amount of at least about 5% or 5% to 35% by volume of the mud, such as light crude oil, certain napthas, kerosene, fuel oil, gas oil, light lubricating oil, coal oil, diesel, light shale oil, pure or mixed liquid aliphatic hydrocarbons, or mixtures thereof; an aqueous medium, such as water or brine, such as sodium chloride solutions, calcium chloride solutions, potassium chloride solutions, calcium sulfate solutions, or a mixture of such solutions, present in amounts of about 0.5 lbs/gal (ppg) to saturation (2.5 lbs/gal); a viscosifier, such as starches or starch derivatives, such as converted starches; water-dispersible cellulose derivatives; polysaccharide gums, carboxyalkyl cellulose ethers, hydroxyalkyl cellulose ethers, carboxymethyl starch, or *xanthomonas* (xanthan) gum (XC polymer) galactomannan gums present in amounts of from about 0.005 to about 0.02 ppg; a filtration control agent, such as processed starch with biocide, carboxymethyl cellulose, or pre-gelatinized starch, present in amounts of from about 0.05 to about 0.25 ppg; and a pH control agent, such as a caustic, such as KOH and MgO to achieve a pH of the mud, such as eight to twelve or ten.

Additionally, if the liquid portion 145$\ell$ is oil or oil based, one or more solid hydrophilic polymer prills may be added to the drilling fluid. If water from an exposed formation should enter the annulus, the prill will absorb the water and swell up, thereby facilitating removal from the returns by the solids shaker.

Additionally, the drilling fluid may have properties which are not normally acceptable in conventional drilling, parameters, such as viscosity reduced to a level where the fluid could be weighted up quickly in the event that the well requires hydrostatic control, relatively low density, and filtration rate not controlled and tending to be substantially higher than that used in conventional operations.

Alternatively, the liquid portion 145ℓ may be pure base oil, pure water, brine, or water treated with a shale stabilizer, such as Dionic, NCL-100, or cc300kf (without viscosity additives).

The liquid portion 145ℓ of the drilling fluid 145f may be stored in a reservoir, such as one or more tanks 5 or pits. The tanks 5 may be in fluid communication with one or more rig pumps 10 which pump the liquid 145ℓ portion through an outlet conduit 12, such as pipe. The outlet pipe 12 may be in fluid communication with a nitrogen outlet line 27 and a standpipe 28.

The gas portion 145g of the drilling fluid 145f may be produced by one or more of the NPUs 20. Each NPU 20 may be in fluid communication with one or more air compressors 22. The compressors 22 may receive ambient air and discharge compressed air to the NPUs 20. The NPUs 20 may each include a cooler, a demister, a heater, one or more particulate filters, and one or more membranes. The membranes may include hollow fibers which allow oxygen and water vapor to permeate a wall of the fiber and conduct nitrogen through the fiber. An oxygen probe (not shown) may monitor and assure that the produced nitrogen meets a predetermined purity. One or more booster compressors 25 may be in fluid communication with the NPUs 20. The boosters 25 may compress the nitrogen exiting the NPUs 20 to achieve a predetermined injection or standpipe pressure. The boosters 25 may be positive displacement type, such as reciprocating or screw, or turbomachine type, such as centrifugal.

A pressure sensor (PI), temperature sensor (TI), and flow meter (FM) may be installed in the nitrogen outlet 27 and in data communication with a surface controller (SC, not shown). The SC may monitor the flow rate of the nitrogen and adjust the air compressors and/or booster compressors to maintain a predetermined flow rate. Additionally, the SC may monitor a speed of the pump 10 and adjust a speed of the pump 10 to maintain a predetermined flow rate. Additionally, the outlet 12 may include a FM in communication with the SC.

The liquid 145ℓ portion and gas 145g portion may be commingled at the junction 32 of the outlet lines, thereby forming the drilling fluid 145f. The drilling fluid 145f may flow through the standpipe 28 and into the drill string 135 via a swivel (Kelly or top drive). The drilling fluid 145f may be pumped down through the drill string 135 and exit the drill bit 140, where the fluid may circulate the cuttings away from the bit 140 and return the cuttings up an annulus 110 defined between an inner surface of the casing 115 or wellbore 100 and an outer surface of the drill string 135. The return mixture (returns) 145r may return to the surface 105 and be diverted through an outlet of a rotating control device (RCD) 15 and into a primary returns line (PRL) 29. Alternatively, the drilling fluid may be pumped into the annulus and return through the drill string (aka reverse circulation).

The RCD 15 may provide an annular seal around the drill string 135 during drilling and while adding or removing (i.e., during a tripping operation to change a worn bit) segments or stands to/from the drill string 135. The RCD 15 achieves fluid isolation by packing off around the drill string 135. The RCD 15 may include a pressure-containing housing mounted on the wellhead 40 where one or more packer elements are supported between bearings and isolated by mechanical seals. The RCD 15 may be the active type or the passive type. The active type RCD uses external hydraulic pressure to activate the packer elements. The sealing pressure is normally increased as the annulus pressure increases. The passive type RCD uses a mechanical seal with the sealing action supplemented by wellbore pressure. If the drillstring 135 is coiled tubing or other non-jointed tubular, a stripper or pack-off elements (not shown) may be used instead of the RCD 15. One or more blowout preventers (BOPS) 16-18 may be attached to the wellhead 40. If the RCD is the active type, it may be in communication with and/or controlled by the SC. The RCD 15 may include a bleed off line to vent the wellbore pressure when the RCD is inactive. A bleed line 54 may be included for removing the RCD 15 for servicing.

A PI may be installed in the PRL 29 and in data communication with the SC. Additionally, a TI (not shown) may be installed. One or more control valves or variable choke valves 30 may be disposed in the PRL 29. The choke 30 may be in communication with the SC and fortified to operate in an environment where the returns 145r contain substantial drill cuttings and other solids. The choke 30 may be fully open or bypassed during normal drilling and present only to allow the SC to control backpressure exerted on the annulus 110 should a kick occur. Alternatively, the choke 30 may be employed during normal drilling to exert a predetermined back pressure on the annulus to vary bottom hole pressure independent of the liquid 145ℓ and gas 145g injection rates.

The drill string 135 may include a drill bit 140 disposed on a longitudinal end thereof. The drill string 135 may be made up of joints or segments of drill pipe, casing, or liner threaded together or coiled tubing. The drill string 135 may also include a bottom hole assembly (BHA) (not shown) that may include the bit 140, drill collars, a mud motor, a bent sub, measurement while drilling (MWD) sensors, logging while drilling (LWD) sensors and/or a check or float valve (to prevent backflow of fluid from the annulus). The mud motor may be a positive displacement type (i.e., a Moineau motor) or a turbomachine type (i.e., a mud turbine). The drill string 135 may further include float valves distributed therealong, such as one in every thirty joints or ten stands, to maintain backpressure on the returns while adding joints thereto. The drill bit 140 may be rotated from the surface by the rotary table or top drive and/or downhole by the mud motor. If a bent sub and mud motor is included in the BHA, slide drilling may be effected by only the mud motor rotating the drill bit and rotary or straight drilling may be effected by rotating the drill string from the surface slowly while the mud motor rotates the drill bit. Alternatively, if the drill string 135 is coiled tubing, the BHA may include an orienter to switch between rotary and slide drilling. If the drill string 135 is casing or liner, the liner or casing may be suspended in the wellbore 100 and cemented after drilling.

The returns 145r may then be processed by a separator 35. The separator 35 may be a four-phase horizontal separator. An oil outlet 35o and a water outlet 35w in communication with respective compartments of the separator 35 may conduct the liquid portion of the returns 145r to a solids shaker 60. A sparge pump 55 may deliver a predetermined quantity of the liquid portion 145ℓ of the drilling fluid 145f from the mud tanks 5 to the solids compartment of the separator 35 to flush cuttings. The cuttings slurry may be discharged to the shaker via a solids line 35S. The recombined liquid 145ℓ and solids may flow through a combined outlet to a solids shaker

60. Additionally, the separator 35 may include a level sensor (not shown) in data communication with the SC for detecting the liquid/mud level in the separator. Additionally, an FM (not shown) may be disposed in the water 35w and oil outlets 35o and in fluid communication with the SC.

The separator 35 may further include a gas outlet 35g to a flare 45 or gas recovery line. The gas outlet line 35g may include a FM in data communication with the to measure the flow rate of returned gas. The gas outlet line may further include an adjustable control valve or choke 37 in communication with the SC which may be used to control pressure in the separator and/or to control back pressure exerted on the annulus 110 if erosion of the choke 30 becomes a problem. A pressure relief line 35f may include a pressure relief valve in communication with the gas compartment of the separator 35 and lead to the flare 45.

Alternatively, the separator 35 may be a vertical separator or a cyclonic separator and may separate two or more phases. For example, a two-phase separator may be used to separate gas and then the remaining liquid and cuttings may be discharged to a solids shaker. Alternatively, the remaining liquid and cuttings may instead be discharged to a second, lower pressure separator. The lower pressure separator may be a three-phase separator (gas, liquid, and solids/slurry) from which the gas may vent to a second flare or cold vent, the liquids may be discharged to the mud tank, and the solids/slurry may be discharged to a shaker.

The solids shaker 60 may remove heavy solids from the liquid portion 145$\ell$ and may discharge the removed solids to a solids bin (not shown). An outlet line of the shaker 60 may lead to a first of the tanks 5. An outlet of the first tank 5 may feed a centrifuge 65 which may remove fine solids from the liquid 145$\ell$ and discharge the removed fines to the bin. Additionally, the solids bin may include a load cell (not shown) in data communication with the SC. An outlet line of the centrifuge 65 may discharge the liquid portion 145$\ell$ into a second one of the mud tanks 5.

A bypass line 53 may be included to provide the option of closing the PRL 29 and bypassing the choke 30 and the separator 35. The bypass line 53 may lead directly to the solids shaker 50. The bypass line 53 may be used to return to conventional overbalanced drilling in the event that the wellbore becomes unstable (i.e., a kick or an unstable formation). One or more secondary lines 51 may be provided to allow circulation in the event that one or more of the BOPS 16-18 are closed. The secondary lines 51 may include one or more chokes 41 and lead to a degasser 42.

One or more fuel, such as propane, natural gas, or methane, tanks 45f may be provided to maintain ignition in the flare 45. The fuel 45f may be a liquid in the tanks and vaporized in a pilot line 45p to the flare 45 by a vaporizer 45v.

If the drill string 135 is made up of jointed drill pipe or casing, joints periodically need to be added to the drill string. Injection of the drilling fluid 145f may be halted to add a joint. The standpipe 28 may be vented and the float valves may close to prevent backflow of returns through the drill string 135. The choke 30 may be closed to prevent loss of the dynamic BHP due to halting circulation of the drilling fluid. Alternatively, only injection of the gas portion 145g may be halted and injection of the liquid portion 145$\ell$ may instead be diverted from the standpipe to a kill line 13 and into one of the chokes 30,41 so that the choke 30,41 may compensate for the loss of dynamic BHP. Alternatively, injection of the drilling fluid 145f may be diverted into the kill line 13 and through the choke 30 to compensate for the loss of the BHP. Alternatively, a continuous circulation system or continuous flow subs may be used to maintain circulation while adding joints to the drill string 135. Alternatively, a safety factor may be utilized or the formation may be stable so that loss of the dynamic BHP is not a concern and no attempt to maintain or compensate for loss of dynamic BHP is necessary.

Stands may have to be removed or added if the drill string 135 has to be removed or tripped to change the drill bit 140. During adding or removing stands, the NPUs 20 may be shut down so that only the liquid 145$\ell$ is injected through the drill string 135. For shutdown of the NPUs 20 and/or to prevent overpressure of the compressors 22, 25, a bleed line 52 may include a branch 52s to the separator and a branch 52t to the mud tanks 5 and a vent line 56 may lead to atmosphere. The circulation may be continued until the annulus 110 is filled to a predetermined level, such as partially, substantially, or completely, with the liquid/mud. Once the annulus 110 is filled to the predetermined level, circulation may be halted by shutting the rig pumps 10 down. The predetermined level may be selected so that the exposed formations are near-balanced or overbalanced. If a stand is being removed, the liquid 145$\ell$ may be added via the kill line 13 to maintain the liquid level in the annulus. Alternatively, if the density of the liquid is insufficient for overbalancing the exposed formation(s), a higher density liquid may be used to overbalance the exposed formation(s). This higher density liquid/mud may be pre-mixed in a kill tank (not shown) or may be formed by adding weighting agents to the liquid.

Various shutoff valves (i.e., gate or ball valves), and check valves are shown. The shutoff valves may be in communication with the SC so that they are opened or closed by the SC.

Alternatively, a dual concentric drill string may be used instead of the drill string 135. A concentric drill string may be particularly useful for delicate formations, such as tar sand formations or coal bed methane formations. A suitable concentric tubular string is illustrated in FIGS. 3A and 3B of International Patent Application Pub. WO 2007/092956, which is herein incorporated by reference in its entirety. The concentric drill string may include joints assembled together. Each joint may include an outer tubular having a longitudinal bore therethrough and an inner tubular having a longitudinal bore therethrough. The inner tubular may be mounted within the outer tubular. An annulus may be formed between the inner and outer tubulars. Drilling fluid may be injected through the annulus formed between the tubulars and return to the surface via the inner tubular bore or vice versa. The delicate formations may then be spared from exposure to the drilling fluid and the returns.

Alternatively, an eccentric dual drill string may be used instead of the concentric dual drill string. A suitable eccentric drill string is illustrated in FIGS. 5A-5E of the '956 PCT. A partition is formed in a wall of each joint and divides an interior of the drill string into two flow paths. A box is provided at a first longitudinal end of the joint and the pin is provided at the second longitudinal end of the joint. A face of one of the pin and box has a groove formed therein which receives a gasket. The face of one of the pin and box may have an enlarged partition to ensure a seal over a certain angle $\alpha$. This angle $\alpha$ allows for some thread slippage. The outer layer of insulation illustrated in the '956 PCT may be omitted.

Figure 2:
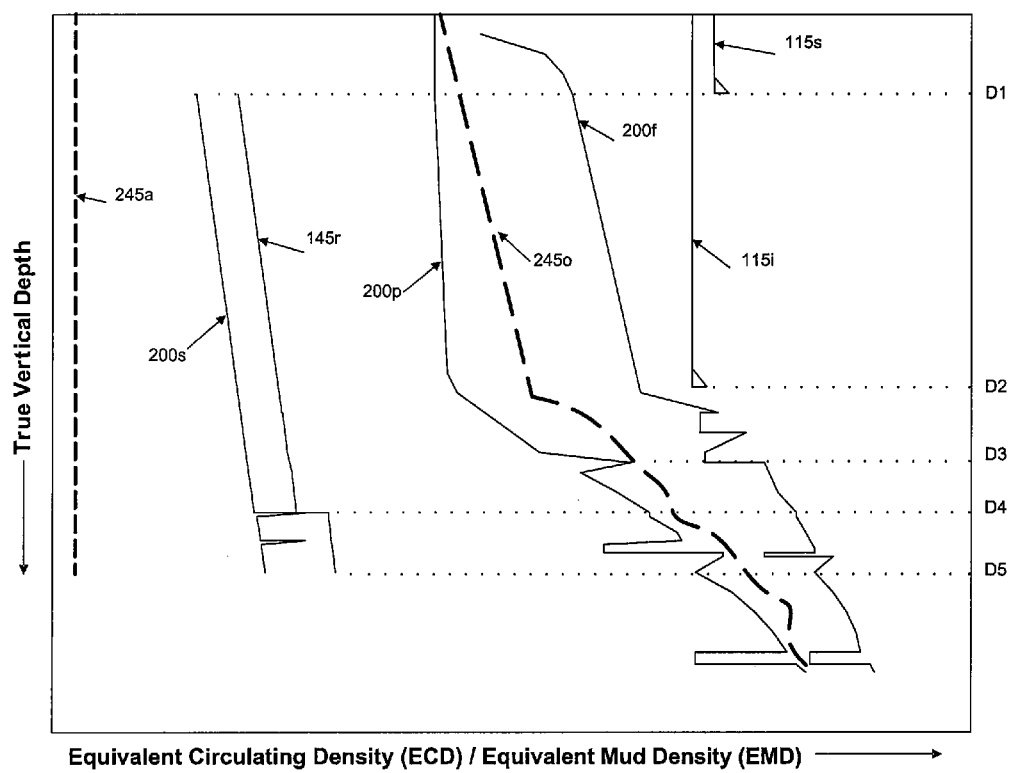
FIG. 2 illustrates a pressure profile comparing an embodiment of the present invention with prior art drilling systems.
Figure 2A:
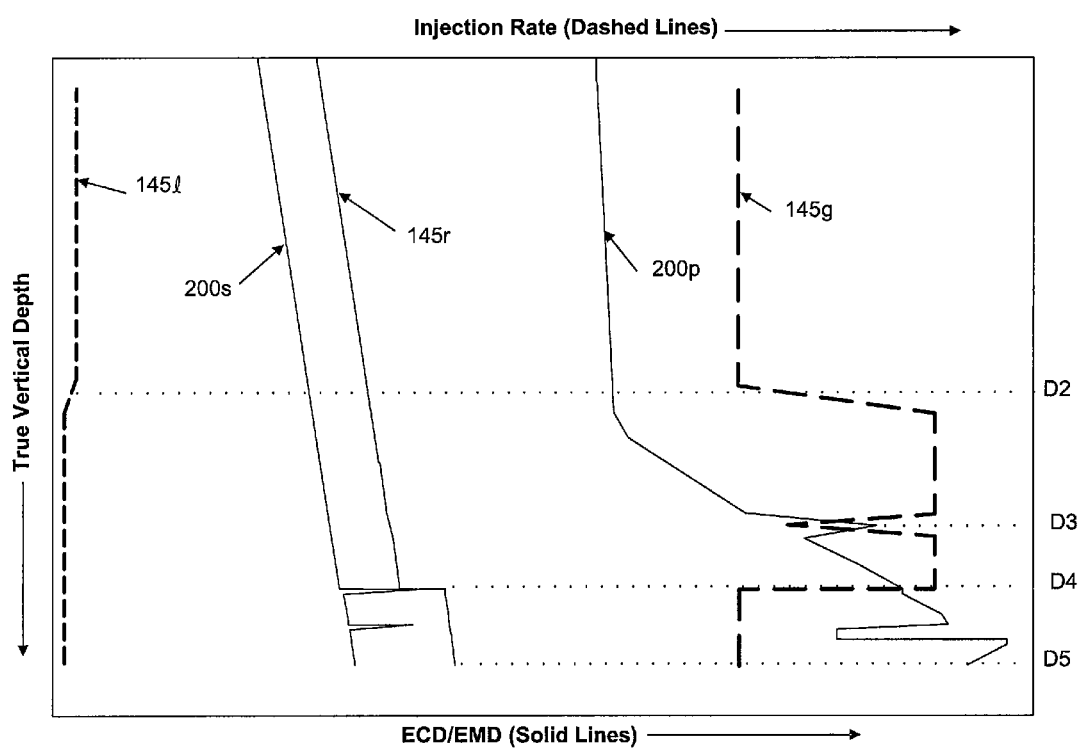
FIG. 2A illustrates controlling injection rates based on formation changes.

FIG. 2 illustrates a pressure profile comparing an embodiment of the present invention with prior art drilling systems. FIG. 2A illustrates controlling injection rates based on formation changes.

As typical, the formations exposed to the wellbore 100 exhibit a pore gradient 200p and a fracture gradient 200f. For analytical convenience, the formation pressure gradients 200f,p are often converted to an equivalent mud density (EMD) and a bottomhole pressure gradient of the returns is converted to an equivalent circulating density (ECD). Conventional overbalanced drilling 245o uses mud having a density so that the pressure exerted by the returns 245o on the exposed formations is within a window defined between the pore 200p and fracture 200f gradients. Some formations also exhibit a stability gradient 200s. If the ECD of the returns is less than the stability gradient 200s, the wellbore 100 may collapse. As discussed above and illustrated, air drilling 245a is unsuitable for these formations that exhibit a stability gradient 200s due to the negligible hydrostatic contribution of air to the ECD of the returns 245a. Note, air drilling 245a may be suitable to drill the wellbore 100 to depth D1 as the exposed formations do not exhibit the stability gradient 200s. Also, as typical, casing or liner strings 115s,i are set at or near depths D1, D2 where changes in the pore 200p and/or fracture 200f gradients occur so that the bottomhole pressure exerted by the overbalanced returns 245o (greater than the pore pressure at bottomhole) does not fracture a formation at a shallower depth.

The injection rates of the gas portion 145g and the liquid 145ℓ portion of the drilling fluid 145f may be controlled so that an ECD of the returns 145r is substantially less than the pore EMD 200p in order to maximize the ROP. For example, the ECD of the returns 145r may be less than or equal two-thirds, one-half, or one-third the pore EMD 200p. For formations exhibiting a stability gradient 200s, the injection rates may be controlled to achieve an ECD 145r equal to or slightly greater than the stability EMD 200s. Maintaining the ECD slightly greater than the stability EMD 200s provides a safety factor against wellbore collapse and will tolerate minor BHP fluctuations, such as those created while adding joints or stands to the drill string 135.

At depth D2, the liquid rate 145ℓ may be substantially decreased and the gas rate 145g may be substantially increased due to a change in hole size resulting from setting of the intermediate casing 115i (note, due to the relative scaling of the injection rates, the decrease in liquid rate is somewhat obscured). The increase in gas injection rate 145g may be necessary to maintain the ECD 145r substantially equal to the stability EMD 200s. At depth D3, a gas kick is experienced, the gas rate 145g may be reduced correspondingly to a rate that the formation gas enters the annulus 110 to maintain a constant ECD 145r. When a gas kick is encountered during conventional overbalanced drilling, drilling is halted and one of the BOPS 16,18 is closed. The choke 41 is used to exert back pressure on the annulus to restore the overbalanced condition. The formation gas is circulated from the wellbore and the density of the drilling mud is increased to restore the overbalanced condition (without the choke). The sequence of steps varies depending on which method (Driller's or Engineer's) is employed. Once the heavier mud has filled the annulus, drilling may continue. In contrast, the RCD 15 and the separator 35 of the drilling system 1 allow drilling to continue through a kick unabated and without a substantial change in ECD, thereby maintaining the ROP.

At depth D4, a formation irregularity, such as sloughing rock, causes an increase in the stability gradient. The gas rate 145g may be correspondingly reduced so that the ECD 145r is maintained at or above the increased stability gradient (by the safety factor). Note, that even after the irregularity is passed, the ECD 145r may still be maintained at the increased level to prevent collapse of the irregularity even when the irregularity is no longer at bottomhole. The method may be halted at depth D5 due to the beginning of a productive formation (the formations above depth D5 may be non-productive).

Advantageously, controlling the ECD of the returns 145r to be substantially less than the pore EMD 200p may also eliminate the need to set one or more of the casing strings 115i,s as sensitivity to changes in the pore and/or fracture EMDs 200p,f is substantially reduced or eliminated.

A liquid volume fraction (LVF) of the drilling fluid may range from 0.01 to 0.07 or 0.01 to 0.025 at STP or be greater than or equal to 0.01 at STP. The injection rates may be controlled to achieve an ECD at a top of an exposed formation or at total depth, such as 100 to 1,000 kg/m$^3$, 200 to 700 kg/m$^3$, or 250 to 1,000 kg/m$^3$. However, for wellbores with serious stability issues or substantial gas potential, the ECD may be increased, such as to 1,200, 1,300, 1,500, or 2,000 kg/m$^3$. Alternatively, the injection rates may be controlled to achieve a predefined LVF at total depth, such as greater than 0.5. Alternatively, the injection rates may be controlled so that a first flow regime (discussed below) is maintained in a lower portion of the annulus, such as along the BHA, and a second flow regime is maintained in an upper portion of the annulus, such as from an upper end of the BHA to at or near the surface.

Alternatively, the injection rates may be controlled to achieve an ECD equal to, substantially equal to, or slightly greater than the pore EMD of the exposed formation. For example, in certain unstable formations, the stability EMD may be proximate to the pore EMD. In these instances, to maintain the ECD substantially equal to the stability EMD, the ECD may need to be greater than the pore EMD.

Figure 3:
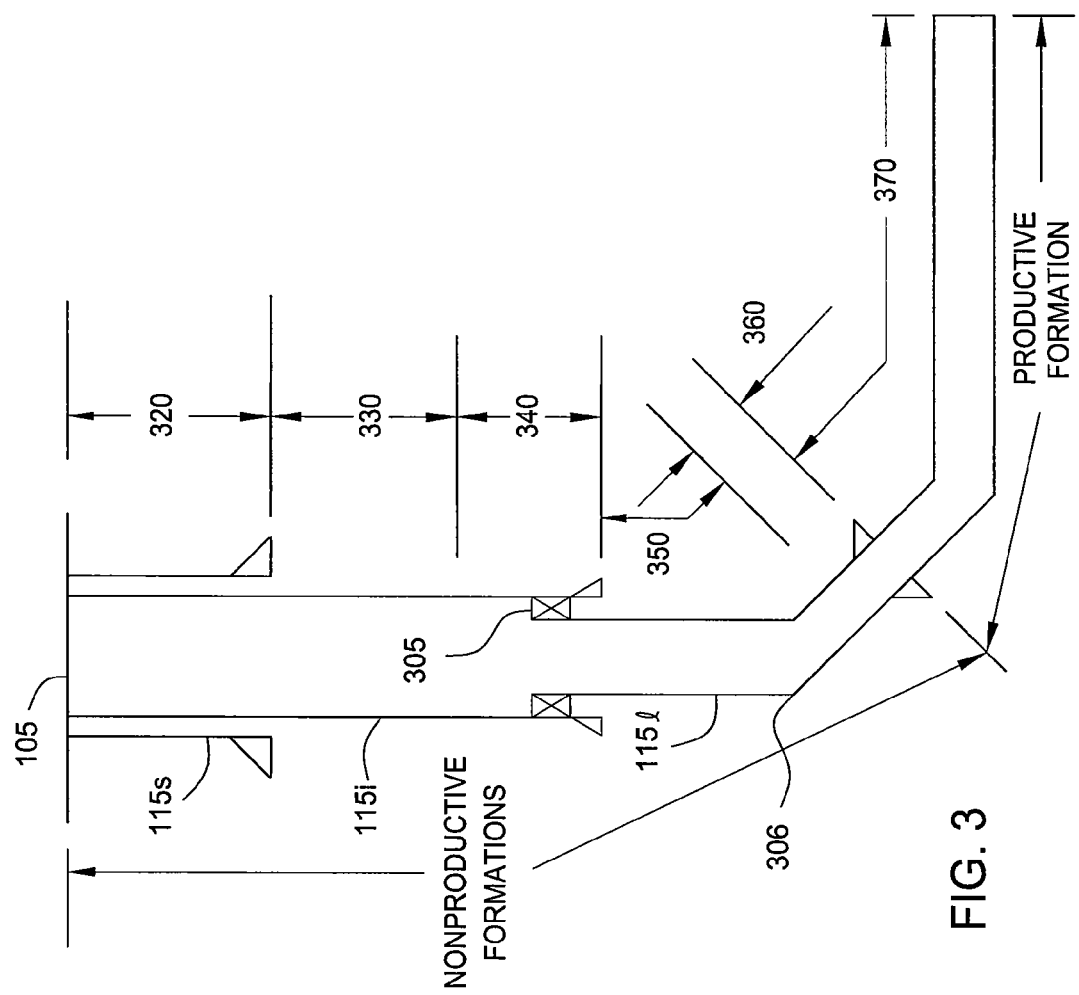
FIG. 3 is a cross-section of an actual wellbore partially drilled with a method, according to another embodiment of the present invention.

FIG. 3 is a cross-section of an actual wellbore 300 partially drilled with a method, according to another embodiment of the present invention. FIG. 3A is a table illustrating intervals of the wellbore 300 drilled with conventional methods and an embodiment of the present invention. FIG. 3B is a table illustrating intervals of other wellbores in the same field drilled with embodiments of the present invention. FIG. 3C is a table illustrating motors used with embodiments of the present invention.

A conductor interval (not shown) was pre-drilled from surface 105 and conductor casing (not shown) was pre-installed. A first interval 320 of the wellbore was air drilled. A surface casing 115s was run-in and cemented into the wellbore 300. A second interval 330 was drilled according to an embodiment of the present invention. In this embodiment, the liquid portion 145ℓ of the drilling fluid was an invert-emulsion oil based mud having a density of 950 kg/m$^3$. The gas portion 145g of the drilling fluid 145f was nitrogen. The gas injection rate 145g during drilling ranged between 80-100 m$^3$/min and the liquid rate 145ℓ was 2.4 m$^3$/min so that the ECD ranged between 600-700 kg/m$^3$. A staging gas rate was used to transition from zero injection once drilling fluid has ceased, due for example to adding a joint or stand to the drill string, to the full drilling gas injection rate. A mud motor was used in the BHA of the drill string. The second interval 330 was stopped before encountering a formation having potential for hydrogen sulfide (a.k.a. sour gas).

A third interval 340 of the wellbore was drilled conventionally overbalanced. An intermediate casing 115i was then run-in and cemented into the wellbore 300. A fourth interval 350 of the wellbore 300 was drilled according to an embodiment of the present invention. In this embodiment, the mud may have been the same mud used as the second interval 330 and a mud motor was also employed. The gas injection was rate was the same as for the interval 330 and the liquid rate ranged between 1.4-1.6 m$^3$/min so that the ECD ranged between 600-700 kg/m$^3$. As discussed above, the reduction in liquid rate is attributable to the reduction in hole size. The fourth interval 350 was drilled to a depth past the kick-off point (KOP) 306. The fourth interval 350 was stopped before encountering a formation having a potential for swelling. A fifth interval 370 was drilled conventionally overbalanced. A production liner 115$\ell$ was run-in and hung from the intermediate casing 115$i$ using a liner hanger and packer 305. The production liner 115$\ell$ was then cemented into the wellbore 300. A sixth interval 370 of the wellbore to total depth and including the horizontal production section was drilled using a calcium carbonate polymer mud and overbalanced due to a potential for sour gas.

Intervals 380 and 390 were drilled using embodiments of the present invention for other wellbores in the same field. The mud used may have been the same as that used for interval 330.

FIG. 3D illustrates ROPs of similar intervals 330$a, b$ in the same field air drilled. The intervals 330$a,b$ were drilled at about the same depth as the interval 330. The ROP for interval 330 was about ten m/hr and the ROPs for the intervals 330$a,b$ were about fifteen and nineteen m/hr, respectively. While not exceeding the ROP of air drilling, the interval 330 is significantly higher than conventional overbalanced drilling and approaching the ROP achieved by air drilling. Further, switching from air to conventional overbalanced drilling for later sections requires a transition time (i.e., filling the wellbore with mud and switching drill bits) which is not a disability of one or more embodiments of the present invention.

Figure 4:
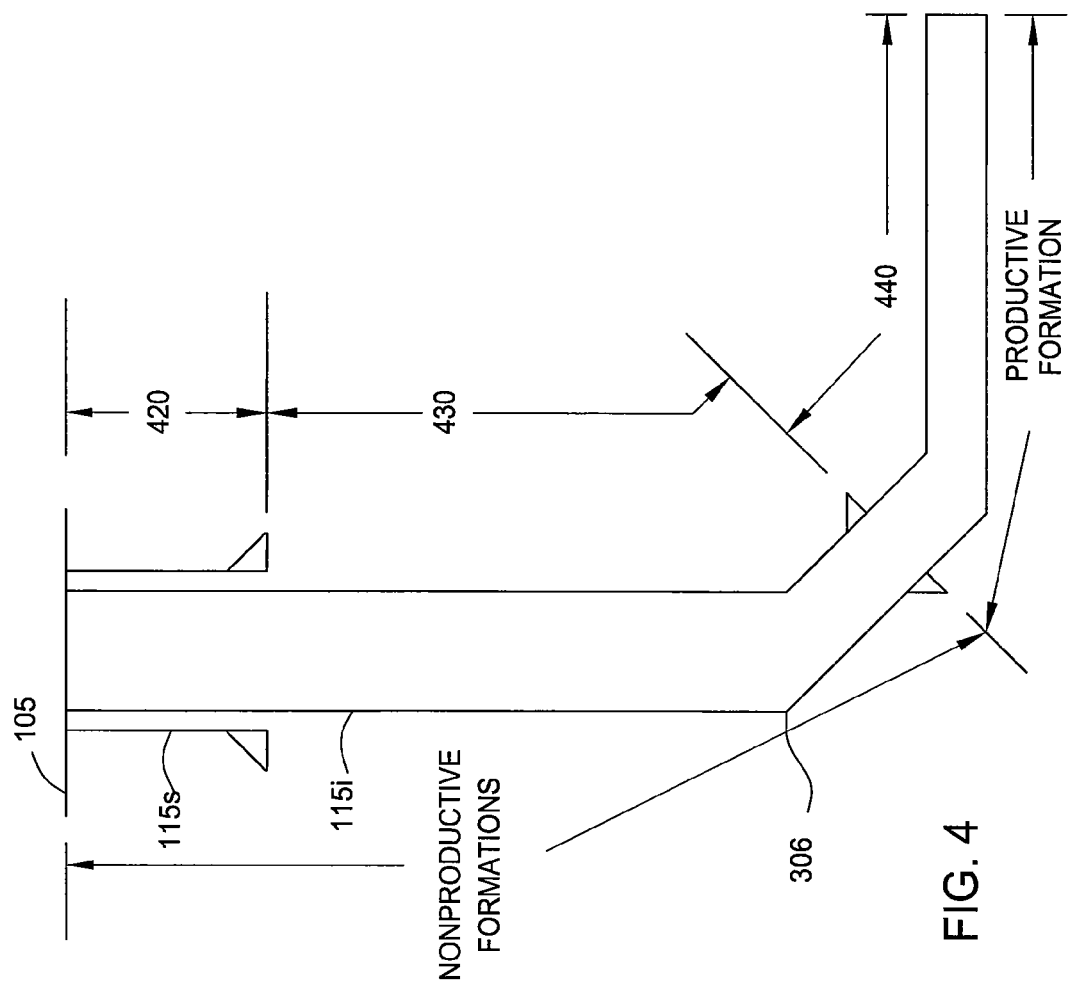
FIG. 4 is a cross-section of an actual wellbore partially drilled with a method, according to another embodiment of the present invention.

FIG. 4 is a cross-section of an actual wellbore 400 partially drilled with a method, according to another embodiment of the present invention. FIG. 4A is a table of intervals of the wellbore 400 drilled with conventional methods and embodiments of the present invention. FIG. 4C is a table illustrating intervals of other wellbores in the same field drilled with embodiments of the present invention. FIG. 4D is a table illustrating motors used with embodiments of the present invention.

A conductor interval (not shown) was pre-drilled from surface 105 and conductor casing (not shown) was pre-installed. A first interval 420 of the wellbore was drilled overbalanced using a gel-slurry mud. A surface casing 115$s$ was run-in and cemented into the wellbore 400. A second interval 430 was drilled, according to an embodiment of the present invention. In this embodiment, the liquid 145$\ell$ portion of the drilling fluid was an invert-emulsion mineral oil based mud having a density of 900 kg/m³. The liquid portion 145$\ell$ of the drilling fluid also had a viscosity equal to 50-55 sec/L, a plastic viscosity less than 12 MPa-s, a yield point equal to 1-2 Pa, a high pressure high temperature (HPHT) filtration equal to 10-15 CC/30 min, an activity ($A_W$) equal to 0.45-0.48, and an oil-to-water ratio equal to 95/5 percent. The gas portion 145$g$ of the drilling fluid was nitrogen. The gas injection rate 145$g$ during drilling was from 50-80 m³/min and the liquid rate 145$\ell$ ranged between 1.2-1.5 m³/min so that the ECD was about 300 kg/m³. The second interval 430 was stopped to install intermediate casing 115$i$. A third interval 440 of the wellbore to total depth and including the horizontal production section was drilled underbalanced.

FIG. 4B is a table of some of the geological formations traversed by the wellbore. The table also illustrates the pore pressure at the top of the formation, and the EMD derived from the pore pressure.

Intervals 450 and 460 were drilled using embodiments of the present invention for other wellbores in the same field. The mud used may have been the same as that used for interval 430.

Figure 5:
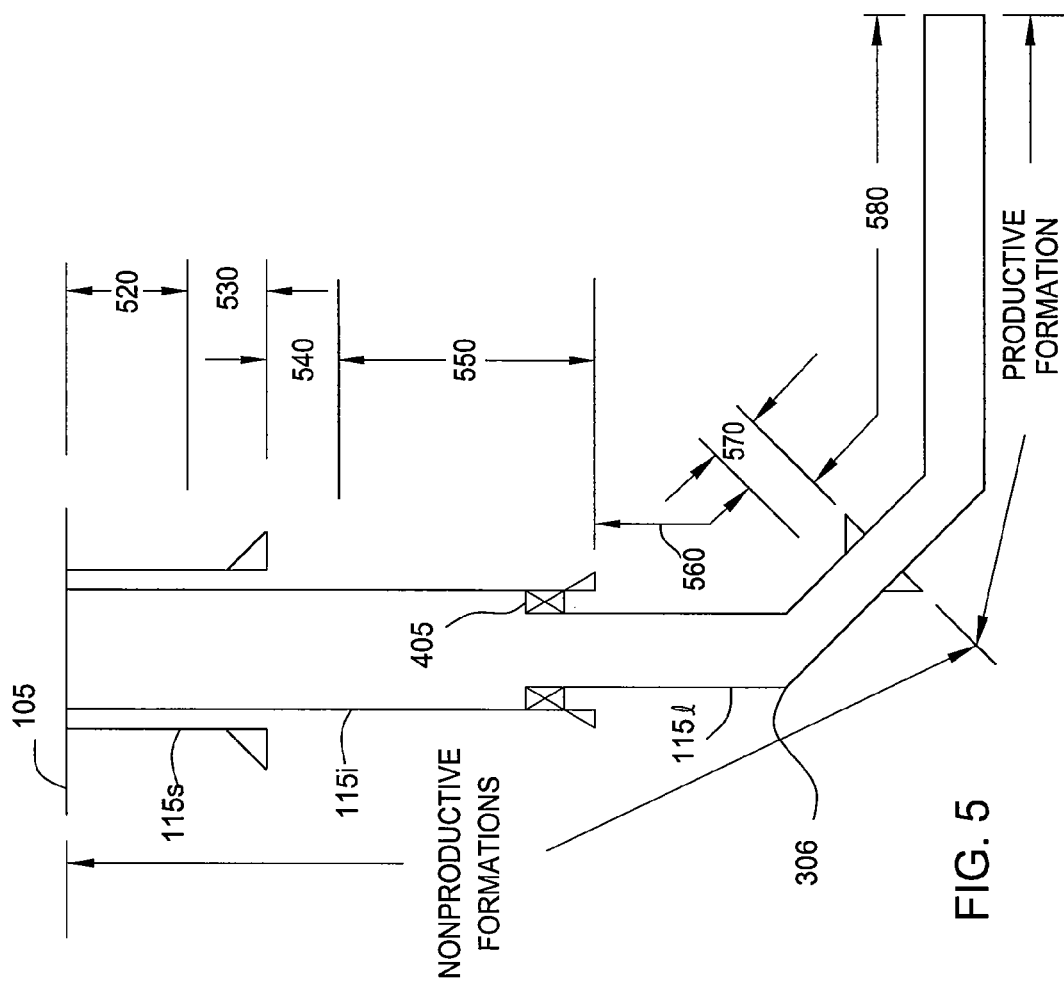
FIG. 5 is a cross-section of an actual wellbore partially drilled with a method, according to another embodiment of the present invention.

FIG. 5 is a cross-section of an actual wellbore 500 partially drilled with a method, according to another embodiment of the present invention. FIG. 5A is a table illustrating intervals of the wellbore 500 drilled with conventional methods and embodiments of the present invention. FIG. 5B is a table of geological formations traversed by the wellbore. FIG. 5C is a table illustrating an interval of another wellbore in the same field drilled with an embodiment of the present invention. FIG. 5D is a table illustrating motors used with embodiments of the present invention.

A conductor interval (not shown) was pre-drilled from surface 105 and conductor casing (not shown) was pre-installed. A first interval 520 of the wellbore was air drilled. The first interval was stopped due to expected fault zones. A second interval 530 was drilled conventionally overbalanced. A surface casing 115$s$ was run-in and cemented into the wellbore 500. A third interval 540 was drilled according to an embodiment of the present invention. In this embodiment, the liquid 145$\ell$ portion of the drilling fluid 145$f$ was an invert-emulsion oil based mud having a density of 850 kg/m³. The liquid portion 145$\ell$ of the drilling fluid 145$f$ also had a viscosity equal to 40 sec/L, a plastic viscosity less than 12 MPa-s, a yield point equal to 1-1.5 Pa, an $A_W$ equal to 0.50, an oil-to-water ratio equal to 95/5 percent, and an electrical stability greater than 500 volts. The gas portion 145$g$ of the drilling fluid was nitrogen. The gas injection rate 145$g$ during drilling ranged between 40-95 m³/min and the liquid rate 145$\ell$ ranged between 2.24-2.6 m³/min so that the ECD was about 600 kg/m³. The third interval 540 was stopped due to intersection with an aquifer.

A fourth interval 550 of the wellbore was drilled conventionally overbalanced. An intermediate casing 115$i$ was then run-in and cemented into the wellbore 500. A fifth interval 560 of the wellbore 500 was drilled according to an embodiment of the present invention. In this embodiment, the liquid 145$\ell$ portion of the drilling fluid 145$f$ was an invert-emulsion oil based mud having a density of 850 kg/m³ The liquid portion 145$\ell$ of the drilling fluid 145$f$ also had a viscosity equal to 40 sec/L, a plastic viscosity less than 12 MPa-s, a yield point equal to 1.5-3.0 Pa, an $A_W$ equal to 0.50, an oil-to-water ratio equal to 95/5 percent, a chloride concentration of 300 k-340 k mg/L, and an electrical stability greater than 500 volts. The gas portion 145$g$ of the drilling fluid 145$f$ was nitrogen. The gas injection rate 145$g$ during drilling ranged between 40-95 m³/min and the liquid rate 145$\ell$ ranged between 2.24-2.6 m³/min so that the ECD was about 600 kg/m³. The fifth interval 560 was drilled to a depth past the kick-off point (KOP) 506 and through a hard and abrasive rock (i.e., sandstone) Formation J. The ROP of was about ten m/hr through the interval 560. The expected ROP for a conventional overbalanced drilling method of this formation is about one to two m/hr.

The fifth interval 560 was stopped before encountering a formation having a potential for swelling. A sixth interval 570 was drilled conventionally overbalanced. A production liner 115$\ell$ was run-in and hung from the intermediate casing 115$i$ using a liner hanger and packer 405. The production liner 115$\ell$ was then cemented into the wellbore 500. A seventh interval 580 of the wellbore to total depth and including the horizontal production section was drilled using a formate mud and overbalanced due to a potential for sour gas.

Interval 590 was drilled using an embodiment of the present invention for another wellbore in the same field. The mud used may have been the same as that used for interval 540.

FIGS. 3-5 also illustrate grouping of the formations by productivity. As used herein, the term productive formation means a formation containing hydrocarbon reserves having a net present value equaling or exceeding the capital investment required to drill and complete the formation. Conversely, the term non-productive formation includes formations having nuisance quantities of hydrocarbon reserves, usually natural gas. One or more embodiments discussed herein may be employed to drill at least a portion of a non-productive formation, one non-productive formation, and/or multiple non-productive formations.

FIGS. 6A-6H are tables illustrating simulated annulus profiles of drilling a wellbore while varying gas injection rate and liquid/mud injection rate, according to other embodiments of the present invention.

To select the liquid rate $145\ell$, a minimum liquid rate may be first selected to achieve a minimum annular velocity to transport the cuttings from the bit. Bit size may be a primary factor in this determination. Once the minimum velocity is selected, ECDs may be modeled using liquid rates greater than or equal to the minimum rate and varying gas rates. If a motor is used to rotate the bit, equivalent liquid velocities (ELVs) may also be calculated and minimum ELV and maximum ELV may be used as a boundary. The target gradient window may be defined including a minimum, such as the stability gradient and a maximum, such as a predetermined ratio above the stability gradient. Once all of the boundaries are set, the liquid and gas rates may be selected.

Alternatively, the liquid and gas rates may be selected so that a velocity of the drilling fluid $145f$ equals or exceeds the slip velocity of the cuttings generated at the bit. The gas portion $145g$ may tend to reduce the viscosity of the drilling fluid $145f$ relative to the viscosity of the liquid portion $145\ell$. The degree of viscosity reduction may be controlled by the gas rate which may increase the shear rate and therefore decrease the viscosity of Bingham/Power-Law fluids. The effect on Newtonian fluids may be less. The increased velocity afforded by adding the gas portion $145g$ may readily compensate for the loss of viscosity.

The simulations include gas injection rates of 100, 110, 120, and 150 m³/min at STP. For each gas injection rate, the liquid injection rate is simulated at 2100 and 2400 l/min (2.1 and 2.4 m³/min). For each simulation, the liquid is plain water and the gas is nitrogen. Each simulation is conducted for an identical wellbore. The simulations illustrate annulus pressure profile, annulus temperature profile, a liquid volume fraction (LVF), gas velocity, liquid velocity, flow pattern or regime, hydrostatic head, friction loss, and ECD at total depth. Also illustrated are gas and liquid transit times, liquid holdup, and motor equivalent liquid velocity (ELV). The ECDs range from about 400 to about 600 kg/m³. As simulated, the annulus flow regime is bubble flow for a lower portion of the annulus and slug flow for an upper portion of the annulus (with a return to bubble flow or annular-mist at the surface). In one example, the flow LVF at total depth ranges from about 0.58 to about 0.75. The injection LVFs at STP (calculated from nominal injection rates) range from 0.0138 to 0.0234. Pressure drop in the annulus is hydrostatically dominated or substantially hydrostatically dominated.

Two or more annulus flow regimes, such as bubble, slug, transition (froth), annular-mist, turbulent (LVF is equal to or substantially equal to one), or laminar (LVF is equal to or substantially equal to one) may be experienced in the annulus for a vertical or substantially vertical interval. Two or more annulus flow regimes, such as stratified, wave, elongated bubble, slug, annular-mist, dispersed bubble (froth), turbulent (LVF is equal to or substantially equal to one), or laminar (LVF is equal to or substantially equal to one) may be experienced in the annulus for a horizontal or substantially horizontal interval. While the liquid/gas injection ratios may be selected to maximize ROP, hydraulic impact and horsepower at the bit, the resultant flow regimes may be adjusted by minor variation in gas/liquid injection ratio and by variation in surface choke pressure.

Advantageously, the drilling fluid $145f$ may be variable in form as the fluid proceeds through the wellbore 100. Initially, this form may include a highly compressed mixture as the drilling fluid moves down the drill string 135, through the bit 140, and by the BHA. The drilling fluid $145f$ may then expand as the returns $145r$ flow up the annulus 110 as the gas $145g$ may become the primary phase, thereby creating high fluid velocity. This high velocity may effectively transport cuttings up the annulus 110 and out of the wellbore 100.

Due to the gas portion $145g$, the drilling fluid $145f$, even when highly compressed may still be a relatively low viscosity, low density, and high filtration mixture as compared to conventional mud. The combination of these parameters has resulted in rates of excavation increasing by as much as an order of magnitude over conventional overbalanced drilling systems. Conventional overbalanced drilling systems cannot maintain such high ROPs as the cuttings removal rates would not be sufficient to prevent the cuttings from choking the annulus. The exceptional circulating properties of the drilling fluid $145f$ may overcome the limitations of conventional mud systems by providing exceptionally high fluid velocities in the annulus and thus removing the cuttings at a rate high enough to prevent the build up of cuttings in the annulus. Further, the use of the drilling fluid $145f$ may reduce or eliminate cuttings beds in directional intervals due to the high degree of fluid turbulence which may be present in the annulus. Such an increase in ROP may substantially reduce the cost of a drilling campaign.

An unexpected result was achieved during field trials: no wellbore erosion occurred in the annulus. Extremely high circulation rates of fluids, be they gas or liquid, involving significant pressure losses between two surfaces may result in a destabilization of the wellbore due to this pressure loss. In conventional mud drilling, annular velocities are controlled in the area of highest pressure drop; which is the narrowest point in the annulus typically located next to the drilling collars, to ensure that erosion of the wellbore does not occur. If the circulating fluid is in laminar flow, then the boundary layer may be such that erosion potential will be limited. However, if the flow is turbulent, then the energy may not be smoothly dissipated across the flow and the effect of erosion can be substantial. During the tried embodiments, high turbulent annulus flow velocities were achieved around the drill collars and no erosion occurred. To verify wellbore integrity, a caliper log was run on one interval drilled with one of the tried embodiments and the results showed a well to have a near perfect gage from beginning to end of the excavation except over a very short interval where a producing hydrocarbon zone was allowed to discharge into the well while drilling operations continued unabated.

The liquid portion $145\ell$ may have low viscosity and high filtrate parameters to further enhance ROP while at the same providing enhanced wellbore stability; as measured by caliper logging technology and increased hole cleaning performance. In a multiphase transitional flow regime fluid optimization of hydraulic impact and hydraulic horsepower is more readily achieved without the dangers of hole erosion.

Figure 7:
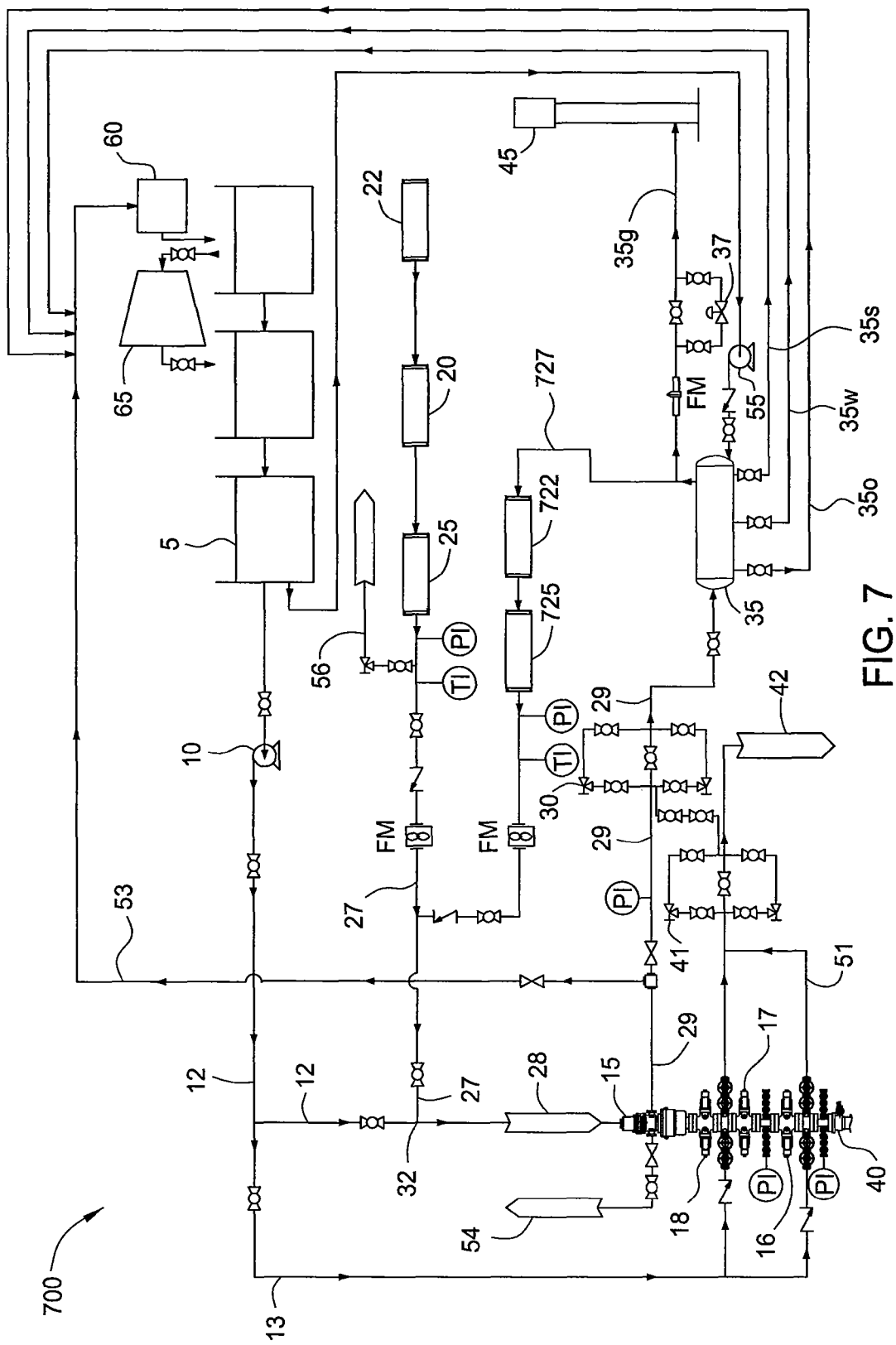
FIG. 7 is a flow diagram of a drilling system, according to another embodiment of the present invention.

FIG. 7 is a flow diagram of a drilling system 700, according to another embodiment of the present invention. Comparing to FIG. 1A, the lines 52,52s,52t, the flare pilot 45f,45v,45p, and the separator relief 35f have been removed for clarity. A recycle line 727 has been added. The recycle line 727 may include a primary compressor 722, a booster compressor 725, instruments TI, PI, and FM, a shut-off valve, and a check valve. The recycle line 727 may conduct gas discharged from the separator 35 to the compressors 722,725 which may re-pressurize the gas and inject the recycled gas into the gas outlet 27. The recycled gas may mix with the NPU nitrogen to form the gas portion 145g of the drilling fluid. The SC may be in communication with the compressors 722,725 and instrumentation to control the flow rate of recycled gas into the outlet 27, such as by controlling the speed of the compressors 722,725 or by further including a flow control valve (not shown) in the recycle line 727. The SC may vent excess gas to the flare by controlling the choke 37. The SC may reduce the nitrogen produced by the NPU 20 accordingly.

The recycle line 727 may further include a hydrocarbon sensor and a hydrogen sulfide sensor in communication with the SC. Upon detection of sour gas, the may shut down the compressors 722,725 and close a solenoid operated shut-off valve (not shown), thereby venting the sour gas to the flare 45. Upon detection of sweet gas, the SC may still recycle the nitrogen/sweet gas mixture. The SC may calculate the flow rate of the sweet/sour gas by performing a mass balance.

Advantageously, injection of recycled gas may conserve energy otherwise used to drive the NPU 20. Further, recycling the gas may further reduce the required capacity of the NPU 20, thereby reducing the footprint of the drilling system 700.

While the foregoing is directed to embodiments of the present invention, other and further embodiments of the invention may be devised without departing from the basic scope thereof, and the scope thereof is determined by the claims that follow.

The invention claimed is:

1. A method for drilling a wellbore, comprising:
   injecting drilling fluid through a drill string disposed in the wellbore;
   rotating a drill bit disposed on a bottom of the drill string, wherein:
   the drilling fluid comprises a liquid and a gas,
   the drilling fluid is injected at the surface,
   the drilling fluid exits the drill bit and carries cuttings from the drill bit, and
   returns comprising the drilling fluid and the cuttings flow to the surface via an annulus formed between the drill string and the wellbore; and
   drilling through at least a portion of a non-productive formation, wherein an injection rate of at least one of the liquid or the gas is controlled so that an equivalent circulating density (ECD) of the returns is equal to or slightly greater than a stability equivalent mud density (EMD) of the formation.

2. The method of claim 1, wherein the liquid is injected at a rate so that a liquid velocity of the returns in the annulus is sufficient to transport the cuttings.

3. The method of claim 1, wherein the injection rate of the at least one of the liquid or the gas is controlled so that the ECD of the returns is substantially less than a pore EMD of the formation.

4. The method of claim 1, wherein a liquid volume fraction of the drilling fluid at standard temperature and pressure is greater than or equal to 0.01 and less than or equal to 0.07.

* * * * *